US011411456B2

(12) United States Patent
Hirabayashi et al.

(10) Patent No.: US 11,411,456 B2
(45) Date of Patent: Aug. 9, 2022

(54) MOTOR, ROTARY APPARATUS INCLUDING MOTOR, AND VEHICLE INCLUDING AIR CONDITIONING SYSTEM INCLUDING ROTARY APPARATUS

(71) Applicant: Minebea Mitsumi Inc., Nagano (JP)

(72) Inventors: Koichiro Hirabayashi, Hirakata (JP); Yukimasa Matsumura, Kikugawa (JP); Akiko Ikuta, Fukuroi (JP); Minoru Kuroda, Sakaiminato (JP); Bora In, Yonago (JP); Kazuaki Sato, Yonago (JP)

(73) Assignee: MINEBEA MITSUMI INC., Nagano (JP)

( * ) Notice: Subject to any disclaimer, the term of this patent is extended or adjusted under 35 U.S.C. 154(b) by 258 days.

(21) Appl. No.: 15/693,638

(22) Filed: Sep. 1, 2017

(65) Prior Publication Data

US 2018/0069448 A1 Mar. 8, 2018

(30) Foreign Application Priority Data

Sep. 2, 2016 (JP) .............................. JP2016-172047

(51) Int. Cl.
*H02K 5/14* (2006.01)
*H01R 39/24* (2006.01)
(Continued)

(52) U.S. Cl.
CPC ........... *H02K 5/14* (2013.01); *B60H 1/00857* (2013.01); *H01R 39/22* (2013.01); *H01R 39/24* (2013.01);
(Continued)

(58) Field of Classification Search
CPC ...... H02K 13/10; H02K 39/38; H02K 13/105; H02K 39/10; H02K 39/105; H02K 5/148;
(Continued)

(56) References Cited

U.S. PATENT DOCUMENTS

| 2003/0048025 A1 | 3/2003 | Vaucher |
| 2008/0012446 A1* | 1/2008 | Akabane ................ H02K 5/145 310/233 |

(Continued)

FOREIGN PATENT DOCUMENTS

| CN | 102035310 A1 | 4/2011 |
| CN | 202535190 U | 11/2012 |

(Continued)

OTHER PUBLICATIONS

Corresponding U.S. Appl. No. 15/693,881, filed Sep. 1, 2017.
(Continued)

*Primary Examiner* — Bryan R Perez
(74) *Attorney, Agent, or Firm* — Pearne & Gordon LLP

(57) ABSTRACT

A motor includes an armature including a commutator, a bracket including a conductive brush and a first wall part, and a first deformable part. The conductive brush is in contact with the commutator. The first wall part includes a first surface extending along a first surface of the conductive brush. The first deformable part is in contact with both the first surface of the conductive brush and the first surface of the first wall part. The first deformable part is deformable in response to movement of the conductive brush.

14 Claims, 12 Drawing Sheets

(51) Int. Cl.
  *B60H 1/00* (2006.01)
  *H01R 39/22* (2006.01)
  *H01R 39/38* (2006.01)
  *H02K 13/10* (2006.01)
  *H02K 5/24* (2006.01)
  *H02K 7/116* (2006.01)

(52) U.S. Cl.
  CPC .......... *H01R 39/381* (2013.01); *H02K 5/145* (2013.01); *H02K 13/10* (2013.01); *H02K 5/24* (2013.01); *H02K 7/116* (2013.01)

(58) Field of Classification Search
  CPC .......... H02K 5/143; H02K 5/141; H02K 5/14; H02K 5/225; H02K 11/026; H02K 11/024; H01R 39/38
  USPC .................. 310/238, 51, 244–247, 239–240
  See application file for complete search history.

(56) References Cited

U.S. PATENT DOCUMENTS

| 2015/0381016 | A1 | 12/2015 | Tsuda et al. | |
|---|---|---|---|---|
| 2016/0376946 | A1* | 12/2016 | Kajiura | F01L 1/356 123/90.15 |
| 2017/0361681 | A1* | 12/2017 | Matsumura | B60H 1/00842 |

FOREIGN PATENT DOCUMENTS

| JP | 49-009930 Y | 3/1974 |
|---|---|---|
| JP | S57-163179 U1 | 10/1982 |
| JP | 08-107655 A | 4/1996 |
| JP | 09-093877 A | 4/1997 |
| JP | 2003-527059 A | 9/2003 |
| JP | 2008-022619 A | 1/2008 |
| JP | 2015-220969 A | 12/2015 |

OTHER PUBLICATIONS

Notification of Reasons for Refusal dated Aug. 28, 2018 for Corresponding Application No. 2016-172047.
Japanese Office Action dated Nov. 26, 2019 for Corresponding Japanese Application No. 2018-239378 and English translation.
Japanese Office Action dated Aug. 28, 2018 for Corresponding Japanese Application No. 2016-172048 and English translation.
Decision of Refusal dated Aug. 25, 2020 for Corresponding Japanese Application No. 2018-239378 and English translation.
Chinese Office Action dated Feb. 18, 2020 for Corresponding Chinese Application No. 201710780116.5 and English translation.
Chinese Office Action dated Mar. 3, 2020 for Corresponding Chinese Application No. 201710780136.2 and English translation.
Chinese Office Action dated Sep. 16, 2020 for Corresponding Chinese Application No. 201710780136.2 and English translation.
Chinese Office Action dated Sep. 11, 2020 for Corresponding Chinese Application No. 201710780116.5 and English translation.
Japanese Office Action dated Nov. 16, 2021 for Japanese Patent Application No. 2020-191336 and English translation.
Notice of Allowance dated Jun. 28, 2022 for Japanese Patent Application No. 2020-191336 and English translation.

* cited by examiner

MOTOR, ROTARY APPARATUS INCLUDING MOTOR, AND VEHICLE INCLUDING AIR CONDITIONING SYSTEM INCLUDING ROTARY APPARATUS

CROSS REFERENCE TO RELATED APPLICATIONS

This application claims the benefit of Japanese Patent Application No. 2016-172047, filed Sep. 2, 2016, which is hereby incorporated by reference in its entirety.

BACKGROUND

Technical Field

The present disclosure relates to a motor, a rotary apparatus including the motor, and a vehicle including an air conditioning system including the rotary apparatus.

Background

For example, Japanese Patent Application Laid-Open No. 2015-220969 discloses a motor actuator (rotary apparatus) configured to drive a plurality of doors (louvers) provided in an air passage for flowing air of a vehicle air conditioning system.

The rotary apparatus outputs rotation of a rotary shaft of a motor via a plurality of gears to control pivoting of the louvers.

On the other hand, Japanese Patent Application Laid-Open No. 2008-22619 discloses a brushed motor having a brush provided with a damper member in order to reduce mechanical noise of the motor.

Recent years have seen a tendency toward increased quietness in an intra-vehicle environment. For example, a motor-driven vehicle such as an electric car emits no noise from the internal-combustion engine and thus the inside of the vehicle is remarkably quiet.

Such a high degree of quietness emphasizes noise which otherwise would not be noticeable inside a car equipped with an internal combustion engine, and thus a higher degree of low noise than ever before is considered to be required even in various parts of the car.

One source of noise of a rotary apparatus is the motor, and further improvement in quietness can be achieved by using a motor with noise reduced as compared to the motor of the related art.

SUMMARY

The present disclosure is related to providing a motor with reduced noise, a rotary apparatus including the motor, and a vehicle including an air conditioning system including the rotary apparatus.

(1) According to a first aspect of the present disclosure, a motor includes an armature including a commutator; a bracket including a conductive brush and a first wall part, the conductive brush being in contact with the commutator, the first wall part including a first surface extending along a first surface of the conductive brush; and a first deformable part in contact with both the first surface of the conductive brush and the first surface of the first wall part, and the first deformable part being deformable in response to movement of the conductive brush.

(2) In the configuration of (1) described above, the first deformable part is always contact with both the first surface of the conductive brush and the first surface of the first wall part.

(3) In the configuration of (1) or (2) described above, the first surface of the first wall part is a surface parallel to the first surface of the conductive brush.

(4) In the configuration of any one of (1) to (3) described above, the first deformable part includes a rubber member fixed to the first surface of the conductive brush.

(5) In the configuration of any one of (1) to (4) described above, the first deformable part includes one of a gel and a grease.

(6) In the configuration of any one of (1) to (3) described above, the first deformable part is one of a gel or a grease.

(7) In the configuration of any one of (1) to (6) described above, the motor includes: a second wall part provided at the bracket, and a second deformable part, wherein the second wall part includes a second surface extending along a second surface of the conductive brush and is located on a side opposite the first surface of the conductive brush; and the second deformable part in contact with both the second surface of the conductive brush and the second surface of the second wall part is deformable in response to movement of the conductive brush.

(8) In the configuration of (7) described above, the second deformable part is always in contact with both the second surface of the conductive brush and the second surface of the second wall part.

(9) In the configuration of (7) or (8) described above, the second surface of the second wall part is a surface parallel to the second surface of the conductive brush.

(10) In the configuration of any one of (7) to (9) described above, the second deformable part includes a rubber member fixed to the second surface of the conductive brush.

(11) In the configuration of any one of (7) to (10) described above, the second deformable part includes one of a gel and a grease.

(12) In the configuration of any one of (7) to (11) described above, the motor includes: a pair of the conductive brushes in contact with the commutator; a pair of the first wall parts provided to correspond to the respective conductive brushes; a pair of the first deformable parts provided to correspond to the respective conductive brushes; a pair of the second wall parts provided to correspond to the respective conductive brushes; and a pair of the second deformable parts provided to correspond to the respective conductive brushes.

(13) In the configuration of any one of (1) to (12) described above, the motor includes a terminal part and an accommodating part, wherein the bracket includes a hole part, the terminal part includes a terminal and a first end portion, the terminal is passed through the hole part to an outside, the first end portion is joined to the terminal and bent on one end side, an end portion of the conductive brush on a side opposite the commutator side is fixed to the first end portion of the terminal part, the accommodating part accommodates a part of the first end portion of the terminal part, and one of a gel and a grease in contact with both the accommodating part and the one end side of the first end portion of the terminal part is provided in a gap between the accommodating part and the first end portion of the terminal part.

(14) In the configuration of any one of (1) to (13) described above, the motor includes: a frame; and a magnet provided at the frame, wherein the frame includes a bottom part and a side wall part coupled to the bottom part, the bottom part includes a hole part for passing a rotary shaft of the armature through to an outside, and the side wall part covers an outer periphery of the armature and includes an opening part on a side opposite to the bottom part, the magnet is provided at an inner wall surface of the side wall part of the frame, the inner wall surface faces the armature, and the bracket is attached to the opening part of the frame.

(15) In the configuration of any one of (1) to (14) described above, the first surface of the conductive brush is a surface located on a side opposite to the surface in contact with the commutator.

(16) According to the present disclosure, a rotary apparatus includes: the motor including the configuration of any one of (1) to (15) described above; a plurality of gears including an output gear configured to output rotation of the motor to the outside; and a housing configured to house the plurality of gears and the motor.

(17) According to the present disclosure, a vehicle includes: an air conditioning system including the rotary apparatus according to configuration of (16) described above; and a louver controlled by the rotary apparatus.

According to the present disclosure, a motor with reduced noise, a rotary apparatus including the motor, and a vehicle including an air conditioning system including the rotary apparatus are provided.

BRIEF DESCRIPTION OF THE DRAWINGS

FIGS. 6A and 6B are diagrams for explaining a state of a second deformable part while the motor according to the first embodiment is being driven, wherein
FIG. 6A is a plan view of the bracket viewed from a frame side and FIG. 6B is an enlarged view of a dotted line region A1 of FIG. 6A;
FIGS. 7A and 7B are diagrams for explaining a state of a second deformable part while the motor according to the first embodiment is being driven, wherein
FIG. 7A is a plan view of the bracket viewed from the frame side and FIG. 7B is an enlarged view of a dotted line region A2 of FIG. 7A.

DETAILED DESCRIPTION

Modes for carrying out the present disclosure (hereinafter referred to as "embodiments") are described in detail below with reference to the accompanying drawings.

Note that the same components are denoted by the same numbers throughout the explanation of the embodiments.

First Embodiment

Figure 1:
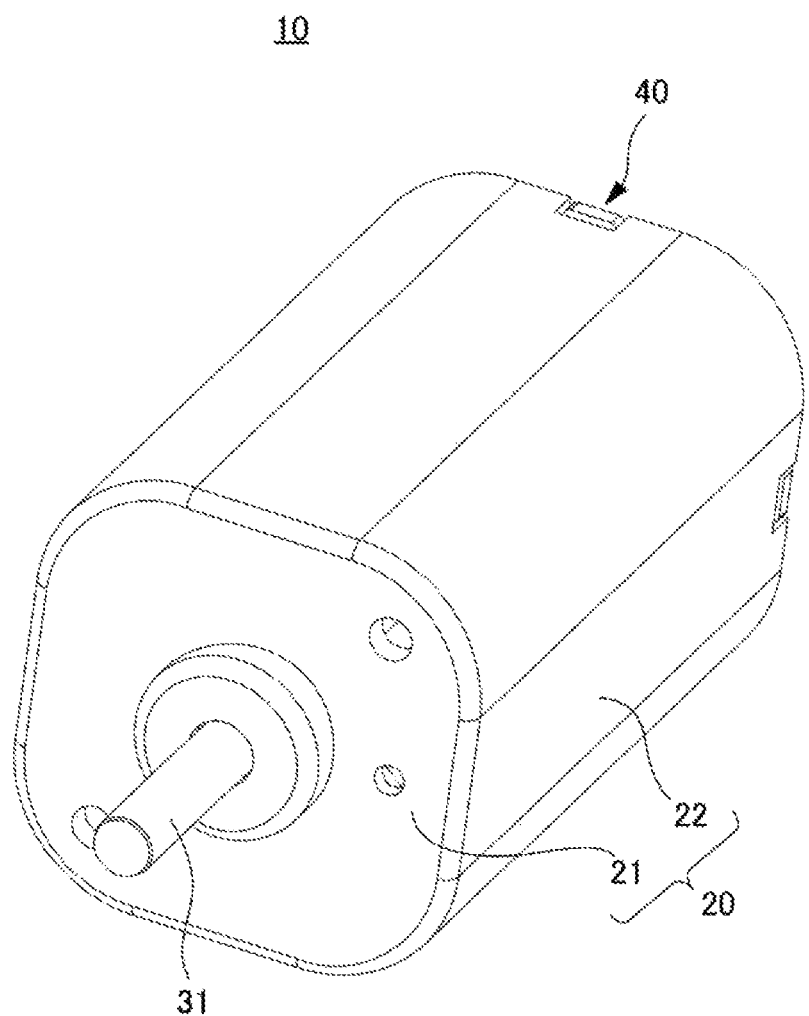
FIG. 1 is a perspective view of a motor according to a first embodiment of the present disclosure.
Figure 2:
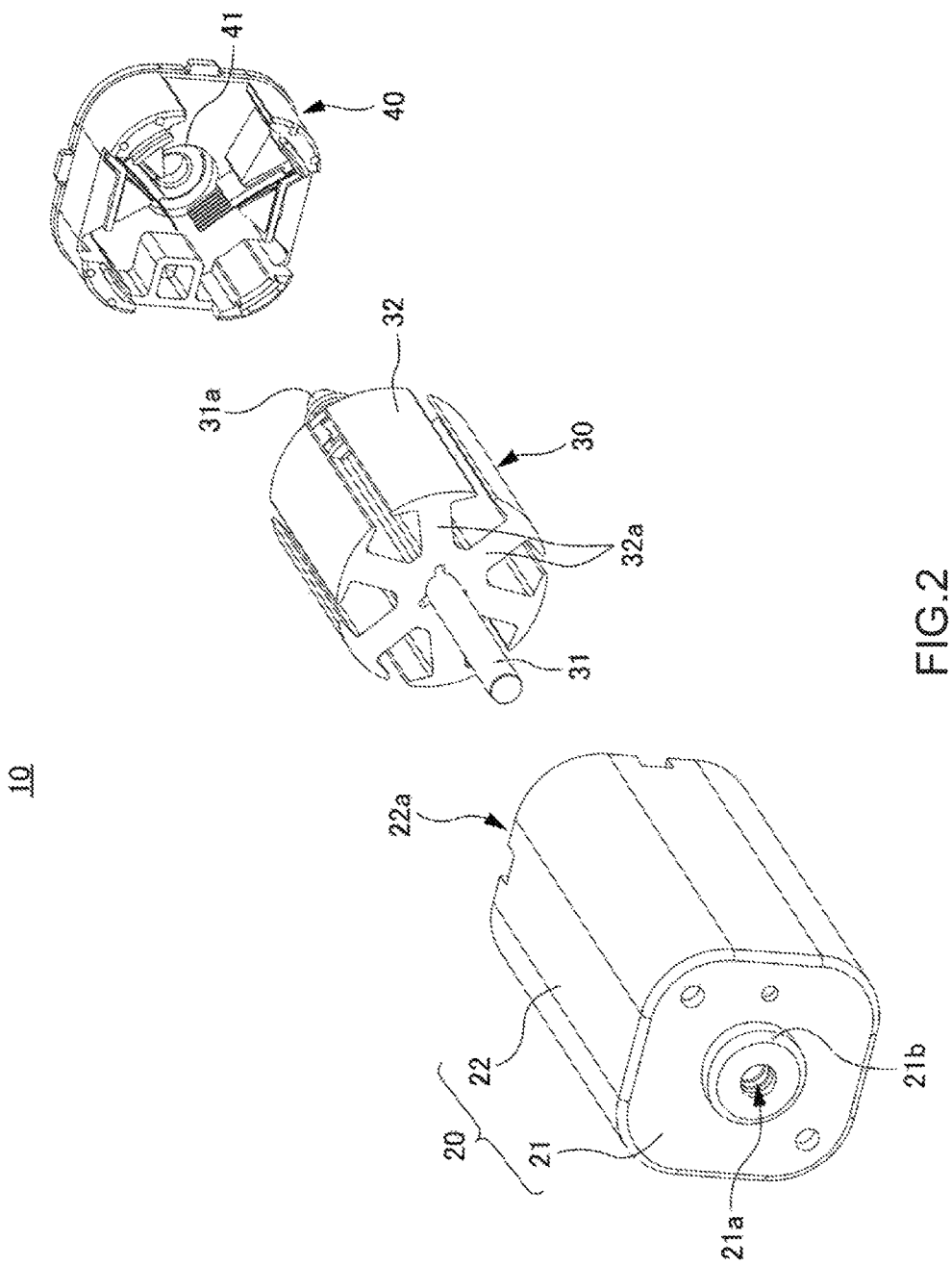
FIG. 2 is an exploded perspective view of the motor according to the first embodiment.

FIG. 1 is a perspective view of a motor 10 according to a first embodiment of the present disclosure. FIG. 2 is an exploded perspective view of the motor 10 according to the first embodiment.

As shown in FIG. 2, the motor 10 includes a frame part 20, a plurality of magnets (not shown) provided in the frame part 20, an armature 30, and a bracket 40.

(Frame Part)

As shown in FIG. 2, the frame part 20 includes a bottom part 21 and a side wall part 22. The bottom part 21 is provided with a hole part 21a for leading out a rotary shaft 31 of the armature 30 to the outside. The side wall part 22 is connected to the bottom part 21 and includes an opening part 22a on a side opposite to the bottom part 21. The side wall part 22 covers an outer periphery of the armature 30.

Note that the bracket 40 is attached to the opening part 22a of the frame 20 to close the opening part 22a of the frame 20.

In the present embodiment, the side wall part 22 of the frame 20 has an outer shape of a square column curved at corners, but the outer shape may be changed as necessary.

The plurality of magnets are disposed at an inner wall surface of the side wall part 22 of the frame 20 opposing the armature 30. The plurality of magnets are spaced apart from the armature 30.

The bottom part 21 of the frame 20 is provided with a bearing part 21b projecting outward in the rotary shaft 31 direction.

The hole part 21a for passing the rotary shaft 31 through is provided at the center of the bearing part 21b.

A bearing rotatably supporting the rotary shaft 31 is housed inside the bearing part 21b.

(Armature)

As shown in FIG. 2, the armature 30 includes a core 32, a coil (not shown) wound around the core 32, and the rotary shaft 31 fixed to the core 32.

The rotary shaft 31 is disposed at the center of the core 32 to penetrate through the core 32.

Note that the core 32 includes a plurality of metal sheets stacked and integrated in the rotary shaft 31 direction.

The plurality of metal sheets may be, for example, electromagnetic steel sheets.

Figure 3:
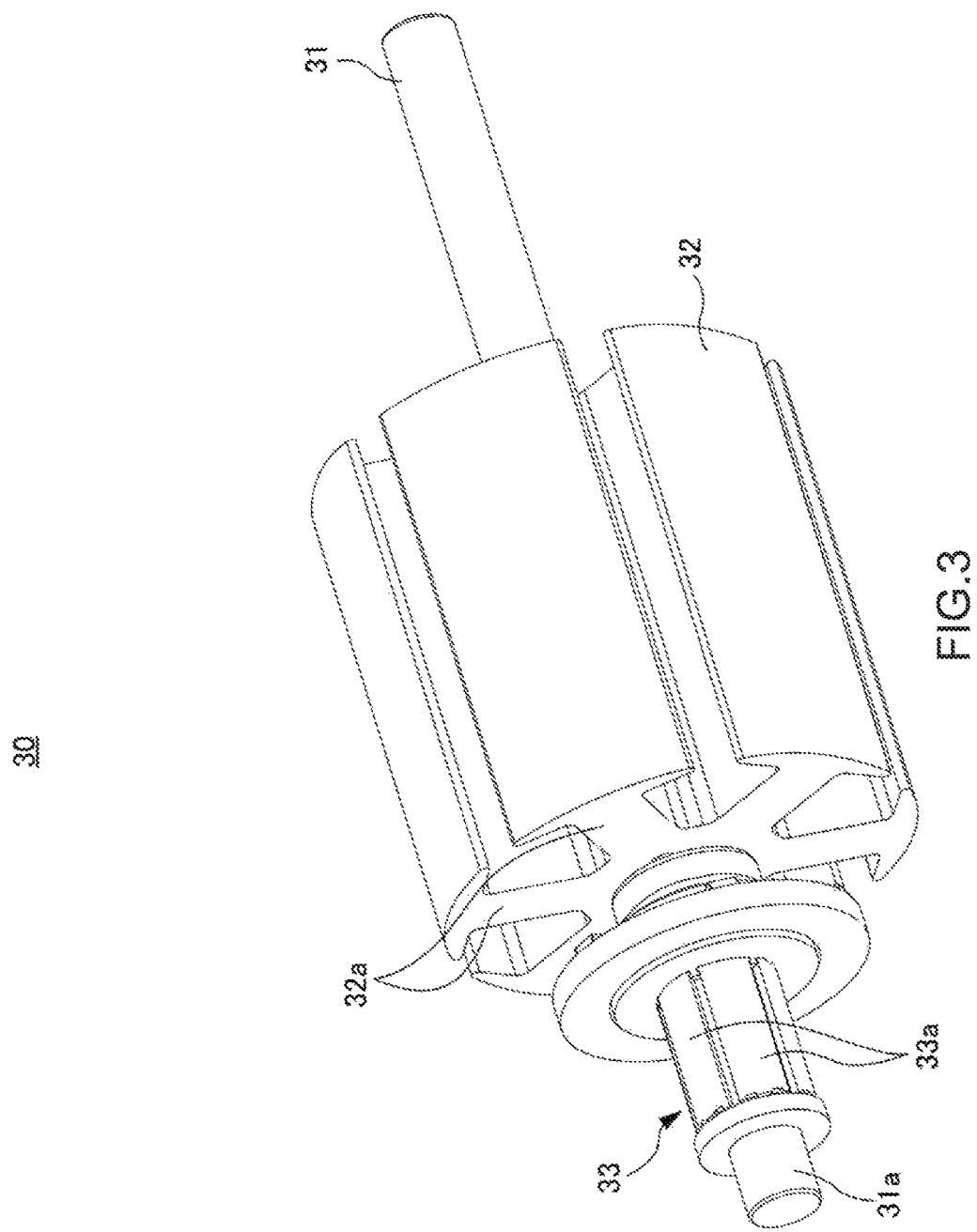
FIG. 3 is a perspective view of an armature according to the first embodiment.

FIG. 3 is a perspective view of the armature 30.

As shown in FIG. 3, the armature 30 includes a commutator 33 provided along an outer circumferential surface of the rotary shaft 31 in a circumferential direction.

The commutator 33 includes a plurality of sheet metals 33a. The rotary shaft 31 has one end part led out to the outside of the motor 10 and the other end part located at an end opposite to the one end part, and the plurality of sheet metals 33a are provided at the other end part side of the rotary shaft 31.

End parts of coils (not shown) wound around respective poles 32a of the core 32 are connected to the sheet metals 33a of the commutator 33 by solder or the like.

Note that another end part 31a of the rotary shaft 31 located further to the other side than the position of the commutator 33 is rotatably supported by a bearing 41 provided in the bracket 40.

(Bracket)

Figure 4:
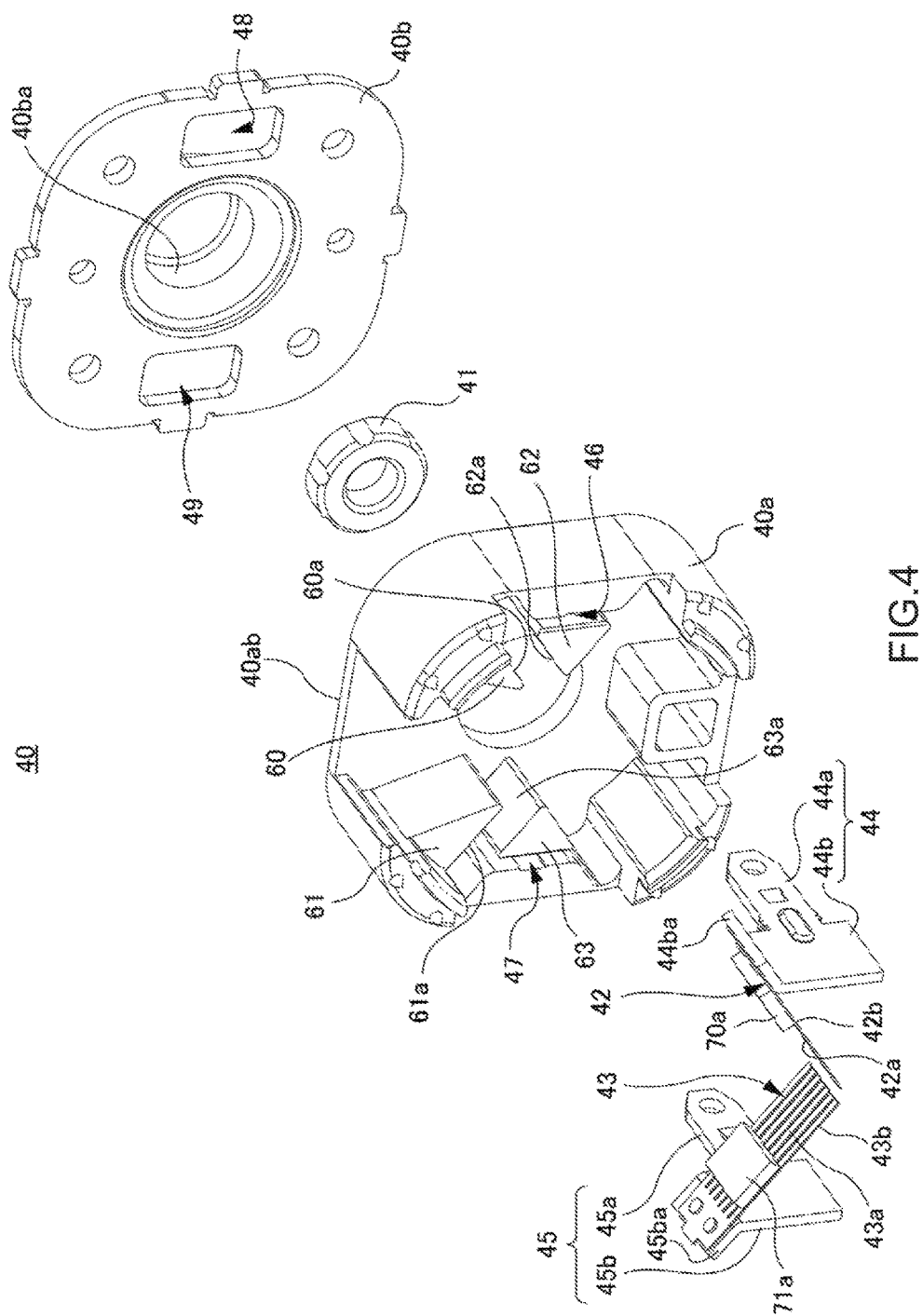
FIG. 4 is an exploded perspective view of a bracket according to the first embodiment.

FIG. 4 is an exploded perspective view of the bracket 40.

As shown in FIG. 4, the bracket 40 includes a bracket main body 40a and a bearing plate 40b.

The bracket main body 40a includes a bottom part 40ab. The bottom part 40ab is located on a side opposite to the frame 20 side.

The bearing plate 40b is attached to the outer side of the bottom part 40ab.

A bearing part 40ba is provided at the center of the bearing plate 40b. The bearing part 40ba projects to a side opposite to the bracket main body 40a.

The bearing 41 is housed in the bearing part 40ba, and the bearing plate 40b is attached to and integrated with the bracket main body 40a. In this manner, the bracket 40 includes the bearing 41.

The bracket 40 includes a pair of conductive brushes (a conductive brush 42 and a conductive brush 43) and a pair of terminal parts (a terminal part 44 and a terminal part 45). The conductive brushes are respectively attached to the pair of terminal parts (a terminal part 44 and a terminal part 45).

The terminal part 44 and the terminal part 45 have substantially the same configuration except that shapes of the terminal part 44 and the terminal part 45 are symmetrical with each other. A bending direction of one end part 44ba side of a first end part 44b described below is opposite to a bending direction of one end part 45ba side of a first end part 45b described below.

Specifically, the terminal part 44 includes a terminal 44a and a first end part 44b. The terminal 44a is led out to the outside. The first end portion 44b is connected to the terminal 44a. A part of the first end part 44b on the one end part 44ba side is bent.

The terminal 44a is a part serving as an external electrical connection.

The terminal part 45 also includes a terminal 45a led out to the outside and a first end part 45b connected to the terminal 45a. A part of the first end part 46b on the one end part 45ba side is bent.

The terminal 45a is a part serving as an external electrical connection.

Figure 5:
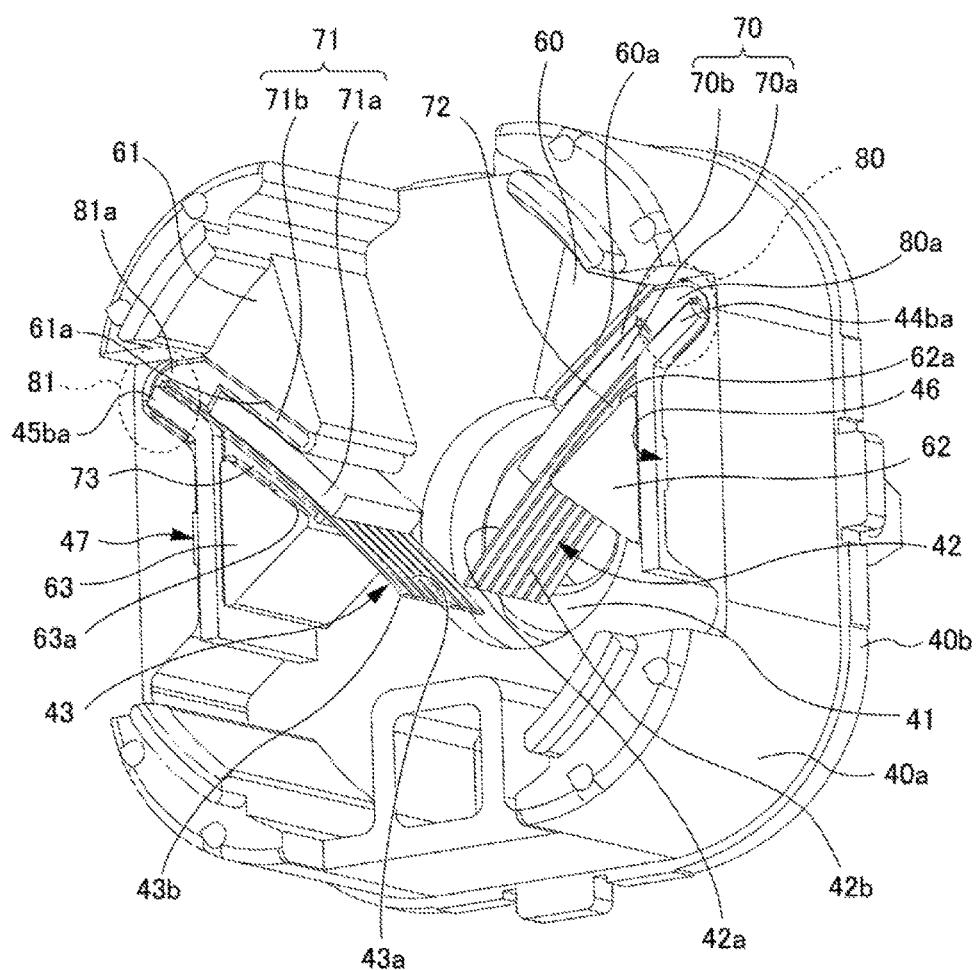
FIG. 5 is a perspective view of the bracket according to the first embodiment.

FIG. 5 is a perspective view of the bracket 40.

As shown in FIG. 4, the bracket main body 40a is provided with a groove part 46. The terminal 44a of the terminal part 44 is inserted into the groove part 46. The bottom part of the groove part 46 includes a hole part for passing the terminal 44a through.

The bottom part of the groove part 46 opposes the bearing plate 40b.

The bearing plate 40b is provided with an opening part 48 corresponding to the terminal 44a of the terminal part 44.

The opening part 48 is disposed at a position opposing the terminal 44a.

Accordingly, as shown in FIG. 5, when the terminal 44a of the terminal part 44 is inserted into the groove part 46 of the bracket main body 40a with the conductive brush 42 being fixed to the terminal part 44, the terminal 44a can be passed through the hole part in the bottom part of the groove part 46 to the outside.

Similarly, as shown in FIG. 4, a groove part 47 is provided in the bracket main body 40a. The terminal 45a of the terminal part 45 is inserted into the groove part 47. The bottom part of the groove part 47A is provided with a hole part for passing the terminal 45a through.

The bearing plate 40b is provided with an opening part 49 corresponding to the terminal 45a of the terminal part 45.

The opening part 49 is disposed at a position opposite the terminal 45a.

Accordingly, as shown in FIG. 5, when the terminal 45a of the terminal part 45 is inserted into the groove part 47 of the bracket main body 40a with the conductive brush 43 being fixed to the terminal part 45, the terminal 45a can be passed through the hole part in the bottom part of the groove part 47 to the outside.

Note that the commutator 33 of the armature 30 is located at a position near the bearing 41 shown in FIG. 5.

Therefore, as it is seen from FIGS. 4 and 5, in a radial direction, an end part of the conductive brush 42 at a side opposite to the commutator 33 side is fixed to one end side of the first end part 44b of the terminal part 44.

More specifically, the end part of the conductive brush 42 is fixed to the one end part 44ba of the first end part 44b. The one end part 44ba is a part at the one end side of the first end part 44b.

Similarly, as to the conductive brush 43, an end part of the conductive brush 43 at a side opposite to the commutator 33 side is fixed to the one end part 45ba of the first end part 45b of the terminal part 45. The one end part 45ba is a part at the one end side of the first end part 44b.

The operation of the motor 10 having the configuration described above will be described below, and a more detailed configuration of the motor 10 will also be described below.

When electric power is supplied through the terminal part 44 and the terminal part 45, an electric current is supplied to the coils via the sheet metals 33a of the commutator 33 in contact with the conductive brush 42 and the conductive brush 43.

Then, the poles 32a (see FIG. 3) are magnetized to an N pole or an S pole depending on a winding direction of the excited coils. Attraction occurs between the poles 32a and a magnetic force of the magnets provided in the frame 20, and the armature 30 rotates.

The commutator 33 also rotates along with the rotation of the armature 30. The conductive brush 42 and the conductive brush 43 come into contact with other sheet metals 33a different from the sheet metals 33a of the above commutator 33 which were previously in contact with the conductive brush 42 and the conductive brush 43.

Consequently, an electric current is supplied to the coils connected to the sheet metals 33a of the commutator 33 which have newly come in contact with the conductive brush 42 and the conductive brush 43. The coils supplied with the electric current are excited, and the poles 32a corresponding to the excited coils are magnetized to the N pole or the S pole depending on the winding direction of the coils.

Then, attraction occurs again between the poles 32a and the magnetic force of the magnets provided in the frame 20, and the armature 30 rotates.

By repeating the above, the rotary shaft 31 of the motor 10 continues to rotate.

When the conductive brush 42 and the conductive brush 43 come into contact with the different sheet metals 33a from the sheet metals 33a of the commutator 33 which were previously in contact with the conductive brush 42 and the conductive brush 43, vibration occurs in the conductive brush 42 and the conductive brush 43, and the vibration causes noise.

In the present embodiment, a first deformable part 72 and a second deformable part 70 are provided to suppress vibration of the conductive brush 42 and a first deformable part 73 and a second deformable part 71 are provided to suppress vibration of the conductive brush 43. Components related to the deformable parts will be described in detail below.

(Second Deformable Part 70)

As shown in FIGS. 4 and 5, the bracket 40 includes a second wall part 60.

The second wall part 60 is provided at the bracket main body 40a.

The second wall part 60 has a second surface 60a extending along a second surface 42a of the conductive brush 42 and toward the commutator 33 side (the center side of the bracket 40). The second surface 42a of the conductive brush 42 is a surface in contacting with the commutator 33.

Note that, in the present embodiment, the second surface 60a of the second wall part 60 is provided as a surface parallel to the second surface 42a of the conductive brush 42.

The second surface 60a of the second wall part 60 is not limited to a surface parallel to the second surface 42a of the conductive brush 42, but may be inclined with respect to the second surface 42a of the conductive brush 42.

As shown in FIG. 5, the motor 10 includes, between the second surface 42a of the conductive brush 42 and the second surface 60a of the second wall part 60, the second deformable part 70 provided to be always in contact with (always adhere to) both of the surfaces (the second surface 42a and the second surface 60a).

Note that "always in contact (always adhere)" as used herein does not mean that a contact (adhering) state is kept until the motor 10 becomes unusable.

That is, as the motor 10 continues to be used for a long period, peeling may occur between the second deformable part 70 and the second surface 42a and peeling may occur between the second deformable part 70 and the second surface 60a.

Therefore, it is to be noted that "always in contact (always adhere)" should be understood to mean that the second deformable part 70 is always in contact with (always adheres to) both of the surfaces as long as an unusual situation such as peeling does not occur, and should not be understood to mean that the second deformable part 70 permanently continues to be in contact with (adhere to) both of the surfaces.

Specifically, the second deformable part 70 includes a rubber member 70a and a buffer member 70b. The rubber member 70a has a flat shape and is fixed to the second surface 42a of the conductive brush 42. The buffer member 70b is a gel or a grease.

Note that the second deformable part 70 does not need to be limited to the second deformable part 70 including the rubber member 70a and the buffer member 70b. For example, the second deformable part 70 may be formed of the buffer member 70b only.

For example, from the viewpoint of suppressing vibration, the rubber member 70a desirably has a rubber hardness compliant with JIS K6253 (shore A hardness) of greater than or equal to 25 and less than or equal to 60.

The gel used in the buffer member 70b may be a two-part hardening type, an ultraviolet curing type, a thermosetting type, or the like. From the viewpoint of suppressing vibration, the hardness of the gel is desirably greater than or equal to 30 and less than or equal to 70 in a type 00 hardness compliant with ASTM D 2240.

Further, from the viewpoint of suppressing vibration, the grease used in the buffer member 70b desirably has consistency of greater than or equal to 60 and less than or equal to 165 in grade 5 or a higher grade.

Note that, by using a gel having a hardness as described above or a grease having consistency as described above, it is possible to obtain the buffer member 70b having a softness that enables suppression of vibration satisfactorily, while suppressing fluidity of the buffer member 70b. Herein, softness is defined as, for example, having viscosity or having elasticity.

With the second deformable part 70 as described above being provided between the second surface 42a of the conductive brush 42 and the second surface 60a of the second wall part 60 in such a manner that the second deformable part 70 is always in contact with both of the surfaces, occurrence of noise can be suppressed. To be more specific, when the conductive brush 42 tends to move in a direction away from the commutator 33, the second deformable part 70 softly deforms or is altered to absorb and stop the movement of the conductive brush 42. Accordingly, it is possible to greatly reduce vibration of the conductive brush 42 due to the movement, and occurrence of noise can be suppressed.

Figure 6A:
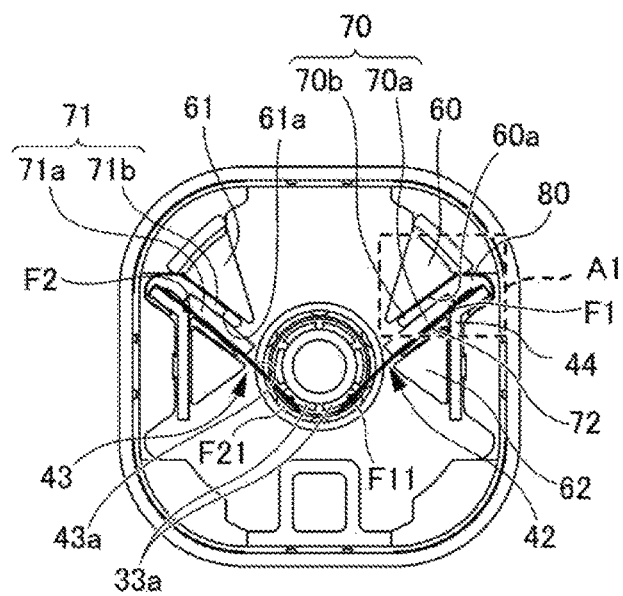
Figure 6B:
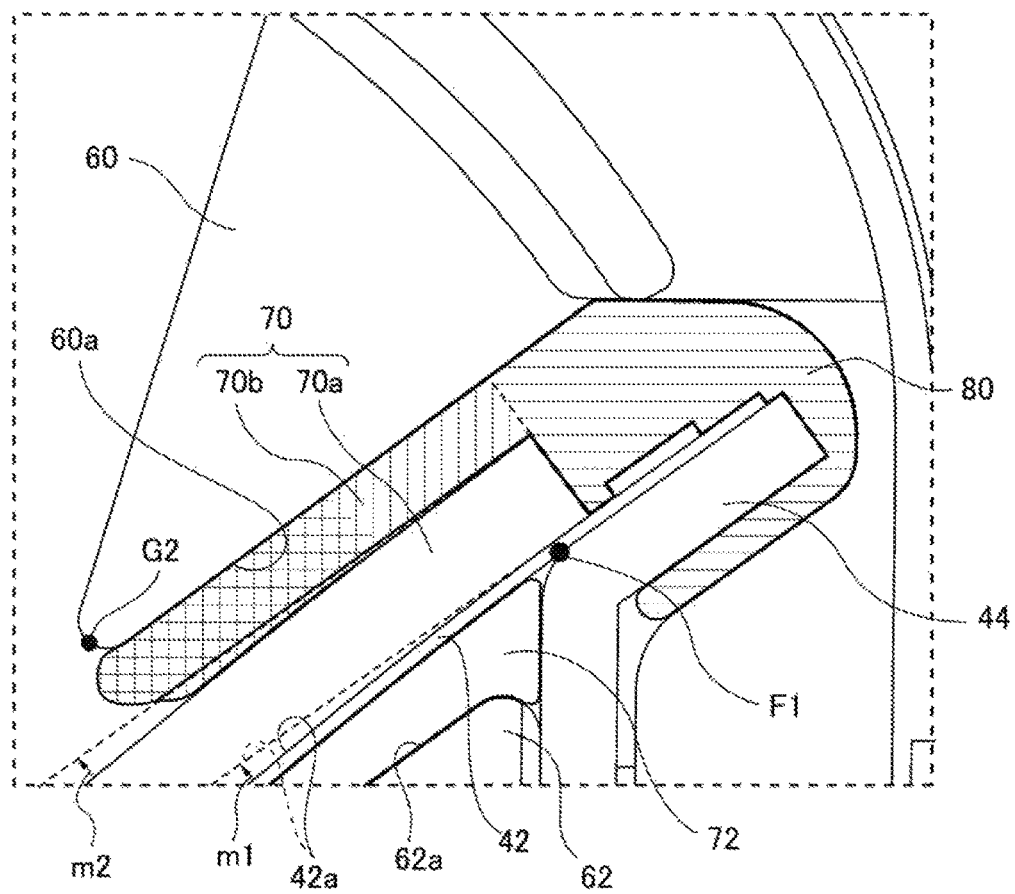

A state of the second deformable part 70 while the motor 10 is being driven is explained more in detail with reference to FIGS. 6A and 6B.

FIGS. 6A and 6B are diagrams for explaining a state of the second deformable part 70 while the motor 10 is being driven. FIG. 6A is a plan view of the bracket 40 viewed from the frame 20 side. FIG. 6B is an enlarged view of a dotted line region A1 of FIG. 6A.

Note that, in FIG. 6A, the sheet metals 33a of the commutator 33 provided in the armature 30 are also shown.

When the motor 10 is driven and the conductive brush 42 vibrates, for example, as shown in FIG. 6B, the second surface 42a of the conductive brush 42 is displaced from a position indicated by a solid line to a position indicated by a dotted line as indicated by an arrow m1.

At this point, the second deformable part 70 is deformed in response to movement of the conductive brush 42.

Specifically, as shown in FIG. 6B, the rubber member 70a moves as indicated by an arrow m2, and the shape of the second deformable part 70 changes from a state indicated by a hatched area to a state indicated by a cross-hatched area in response to the movement of the rubber member 70a. Specifically, the shape of the buffer member 70b deforms in a direction in which the second surface 60a of the second wall part 60 extends or in a direction in which the second surface 42a of the conductive brush 42 extends, and toward the commutator 33.

That is, there is a space where buffer member 70b does not exist. A part of the buffer member 70b escapes (projects) to the space formed between the second surface 42a of the conductive brush 42 and the second surface 60a of the second wall part 60.

Note that, in a case where the rubber member 70a has a low rubber hardness, the shape of the rubber member 70a, like the buffer member 70b, also deforms easily.

The change in shape of the buffer member 70b is a phenomenon caused by the second deformable part 70 being in contact with and sandwiched by both the second surface 42a of the conductive brush 42 and the second surface 60a of the second wall part 60.

That is, even if the second deformable part 70 is in contact with the second surface 42a of the conductive brush 42, if the second surface 60a side of the second wall part 60 is free, a compression force is not applied to the second deformable part 70. Therefore, the change in shape of the second deformable part 70 is extremely small.

As the second deformable part 70 is compressed and the shape changes, a reaction force acts on the conductive brush 42 to stop the movement of the conductive brush 42. The reaction force tends to stop the movement of the conductive brush 42. Therefore, the movement of the conductive brush 42 is suppressed.

Note that depending on a material forming the second deformable part 70, the second deformable part 70 has not only elasticity but also viscosity. Accordingly, as the second deformable part 70 is compressed and the shape of the second deformable part 70 changes, an action of absorbing the force of the conductive brush 42 occurs simultaneously.

On the other hand, when the conductive brush 42 moves oppositely, that is, when the second surface 42a of the conductive brush 42 tends to move in a direction opposite to the direction of the arrow m1 from the position of the dotted line to the position indicated by the solid line shown in FIG. 6B, the shape of the second deformable part 70 changes.

Specifically, the shape of the buffer member 70b deforms in a direction in which the second surface 60a of the second wall part 60 extends or a direction in which the second surface 42a of the conductive brush 42 extends, and toward the end part F1 of the conductive brush 42.

That is, a part of the buffer member 70b returns to a space formed between the second surface 42a of the conductive brush 42 and the second surface 60a of the second wall part 60 where the buffer member 70b is present.

Since the second deformable part 70 is not an elastic body such as a spring, the second deformable part 70 does not immediately return to an original shape with an elastic force of the second deformable part 70. The change in shape of the second deformable part 70 at the time when the conductive brush 42 tends to move to the position indicated by the solid line is mainly caused by a force generated by a bend of the conductive brush 42 (a restoring force).

The second deformable part 70 is pulled in a direction from the second wall part 60 toward the conductive brush 44 by the movement of the conductive brush 42 in the direction opposite to the arrow m1.

Due to the pulling, the shape of the second deformable part 70 changes. The change in shape of the second deformable part 70 causes a reaction force acting on the conductive brush 42. The reaction force tends to stop the movement of the conductive brush 42 in a direction away from the second surface 60a side of the second wall part 60.

Along with the change in shape of the second deformable part 70, action for absorbing (reducing) a moving force of the conductive brush 42 is simultaneously generated.

Note that the reaction force, in other words, stopping action, is also a phenomenon caused by the second deformable part 70 in contact with both the second surface 42a of the conductive brush 42 and the second surface 60a of the second wall part 60. If the second deformable part 70 is not in contact with the second surface 60a of the second wall part 60, the second deformable part 70 moves together with the conductive brush 42 in the same manner.

In this manner, the second deformable part 70 acts to suppress the movement of the conductive brush 42 when the conductive brush 42 tends to move from the position of the solid line to the position of the dotted line shown in FIG. 6B and also when the conductive brush 42 tends to move in a reverse manner from the position of the dotted line to the position of the solid line.

"The conductive brush 42 vibrates" means that the conductive brush 42 repeatedly moves between the position of the solid line and the position of the dotted line shown in FIG. 6B. As described above, the second deformable part 70 acts to suppress the movement both when the conductive brush 42 moves toward the position of the solid line and toward the position of the dotted line, and suppresses the vibration of the conductive brush 42.

Here, a volume of the second deformable part 70 before the change in shape is represented as T, a volume of a part changed in shape by compression or pulling is represented as $\Delta t$, and a shape change ratio VC is represented as $\Delta T/T$. The greater the shape change ratio VC, the greater the extent to which the vibration due to the change in shape can be suppressed.

Therefore, in order to increase the shape change ratio VC, it is desirable to reduce the volume of the second deformable part 70 determined at a state before driving the motor 10.

As is seen from FIG. 6B, the second deformable part 70 is provided to be in contact with both the second surface 42a of the conductive brush 42 and the second surface 60a of the second wall part 60. Therefore, the volume of the second deformable part 70 is adjusted by the distance between the second surface 42a of the conductive brush 42 and the second surface 60a of the second wall part 60.

Specifically, the length and the like of the conductive brush employed varies depending on the size of the motor. Accordingly, the distance between the second surface 42a of the conductive brush 42 and the second surface 60a of the second wall part 60 to provide the second deformable part 70 with an appropriate volume is preferably determined based on the length of the conductive brush 42.

Here, the length from the end part (see the position F1 shown in FIG. 6B where the conductive brush 42 is not supported by the terminal part 44) of the conductive brush 42 on the terminal part 44 side to the position F11 (see FIG. 6A) where the conductive brush 42 is in contact with the commutator 33 is 1. Then, a distance (hereinafter also referred to as first distance) between the second surface 42a of the conductive brush 42 and the second surface 60a of the second wall part 60 is preferably set to be less than or equal to 0.5 and more preferably set to less than or equal to 0.3.

The second wall part 60 is provided in the bracket main body 40a such that the first distance between the second surface 42a of the conductive brush 42 and the second surface 60a of the second wall part 60 is a predetermined distance.

The first distance is obtained as follows. With the conductive brush 42 not in contact with the commutator 33 and the conductive brush 42 extending substantially straight, perpendiculars are drawn from points on the second surface 60a of the second wall part 60 to the conductive brush 42. Then, distances between the second surface 42a of the conductive brush 42 and the second surface 60a of the second wall part 60 are calculated. The first distance is the longest distance among the calculated distances.

On the other hand, if the first distance is too short, the second deformable part 70 sometimes cannot be sufficiently deformed. Therefore, the first distance is desirably set to greater than or equal to 0.1 and more desirably set to greater than or equal to 0.2.

Further, the second deformable part 70 preferably has a certain length along the second surface 42a of the conductive brush 42. Therefore, the second surface 60a of the second wall part 60 preferably has a certain length along the second surface 42a of the conductive brush 42.

Specifically, when a length from the end part (see position F1 in FIG. 6B) of the conductive brush 42 on the terminal part 44 side to position F11 (see FIG. 6A) of the conductive brush 42 in contact with the commutator 33 is 1, the second surface 60a preferably extends to the commutator 33 side such that a perpendicular can be drawn from a point on the second surface 60a of the second wall part 60 to a point on the conductive brush 42 with a length of greater than or equal to 0.4 on the commutator 33 side from the root of the conductive brush 42 on the terminal part 44 side.

Note that, here, the conductive brush 42 is also not brought into contact with the commutator 33, and a perpendicular is drawn to the conductive brush 42 extending substantially straight.

That is, the second surface 60a of the second wall part 60 is preferably provided such that, when a perpendicular is drawn from a position G2 (see FIG. 6B) closest to the commutator 33 side on the second surface 60a of the second wall part 60 to the conductive brush 42, an intersection between the perpendicular and the conductive brush 42 is at a position of a length of greater than or equal to 0.4 from the end part (see position F1 in FIG. 6B) on the terminal part 44 side.

With such a configuration, the second surface 60a corresponding to a range of greater than or equal to 0.4 is provided from the root of the conductive brush 42 on the terminal part 44 side toward the commutator 33 side. Therefore, it is possible to provide the second deformable part 70 over a range of greater than or equal to 0.4.

(Second Deformable Part 71)

The bracket 40 includes a second wall part 61 provided at the bracket main body 40a. The second wall part 61 includes a second surface 61a extending along the second surface 43a of the conductive brush 43 and toward the commutator 33 side (the center side of the bracket 40). The second surface 43a of the conductive brush 43 is a surface in contact with the commutator 33.

Note that the second surface 61a of the second wall part 61 is formed as a surface parallel to the second surface 43a of the conductive brush 43.

The second surface 61a of the second wall part 61 is not limited to a surface parallel to the second surface 43a of the conductive brush 43, but may be inclined with respect to the second surface 43a of the conductive brush 43.

The motor 10 includes, between the second surface 43a of the conductive brush 43 and the second surface 61a of the second wall part 61, the second deformable part 71 provided to be always in contact with (always adhere to) both of the surfaces (the second surface 43a and the second surface 61a).

Note that, as described above for the second deformable part 70, "always in contact (always adhere)" as used herein does not mean that a contact (adhering) state is kept until the motor 10 becomes unusable. "Always in contact (always adhere)" means that the second deformable part 71 is always in contact with (always adhere to) both of the surfaces as long as an unusual situation does not occur during continuous use of the motor 10. Such an unusual situation may be occurrence of peeling between the second deformable part 71 and the second surface 43a or occurrence of peeling between the second deformable part 71 and the second surface 61a. "Always in contact (always adhere)" should not be understood to mean that the second deformable part 71 permanently continues to be in contact with (adhere to) both of the surfaces.

Specifically, the second deformable part 71 includes a rubber member 70a and a buffer member 71b. The rubber member 70a has a flat shape and is fixed to the second surface 43a of the conductive brush 43. The buffer member 71b is a gel or a grease.

Note that the second deformable part 71 does not need to be limited to the second deformable part 71 including the rubber member 71a and the buffer member 71b. For example, the second deformable part 71 may be formed of the buffer member 71b only.

For example, from the viewpoint of suppressing vibration, as described above, the rubber member 71a desirably has a rubber hardness compliant with JIS K6253 (shore A hardness) of greater than or equal to 25 and less than or equal to 60.

The gel used in the buffer member 71b may be a two-part hardening type, an ultraviolet curing type, a thermosetting type, or the like. From the viewpoint of suppressing vibration, the hardness of the gel is desirably greater than or equal to 30 and less than or equal to 70 in a type 00 hardness compliant with ASTM D 2240.

Further, from the viewpoint of suppressing vibration, the grease used in the buffer member 71b desirably has consistency of greater than or equal to 60 and less than or equal to 165 in a grade 5 or a higher grade.

Note that, by using a gel having a hardness as described above or a grease having consistency as described above, the buffer member 71b having a softness that enables suppress of the vibration satisfactorily while suppressing the fluidity of the buffer member 71b can be obtained.

With the second deformable part 71 as described above being provided between the second surface 43a of the conductive brush 43 and the second surface 61a of the second wall part 61 to be always in contact with both of the surfaces, occurrence of noise can be suppressed. To be more specific, when the conductive brush 43 tends to move in a direction away from the commutator 33, the second deformable part 71 softly deforms or is altered to absorb and stop the movement of the conductive brush 43. Accordingly, it is possible to greatly reduce vibration of the conductive brush 43 due to the movement, and occurrence of noise can be suppressed.

The second deformable part 71 is a part for achieving, on the conductive brush 43, the same action as the action of the second deformable part 70 on the conductive brush 42. Therefore, the state of the second deformable part 71 at the time when the motor 10 is driven is the same as the state described concerning the second deformable part 70.

Therefore, although a detailed explanation is omitted, also for the second deformable part 71, the length from the end part (see position F2 shown in FIG. 6A where the conductive brush 43 is not supported by the terminal part 45) of the conductive brush 43 on the terminal part 45 side to position F21 (see FIG. 6A) where the conductive brush 43 is in contact with the commutator 33 is 1. Then, a distance (hereinafter also referred to as first distance) between the second surface 43a of the conductive brush 43 and the second surface 61a of the second wall part 61 is preferably set to be less than or equal to 0.5 and more preferably set to less than or equal to 0.3.

The second wall part 61 is provided in the bracket main body 40a such that the first distance between the second surface 43a of the conductive brush 43 and the second surface 61a of the second wall part 61 is a predetermined distance.

This first distance is obtained as follows, which is similar to how the first distance is obtained as described above for the second deformable part 70. With the conductive brush 43 not in contact with the commutator 33 and the conductive brush 43 extending substantially straight, perpendiculars are drawn from points on the second surface 61a of the second wall part 61 to the conductive brush. Then, distances between the second surface 43a of the conductive brush 43 and the second surface 61a of the second wall part 61 are calculated. The first distance is the longest distance among the calculated distances.

Similarly to the first distance of the second deformable part 70 described above, if the first distance corresponding to the second deformable part 71 is short, the second deformable part 71 sometimes cannot be sufficiently deformed. Therefore, the first distance corresponding to the second deformable part 71 is also desirably set to greater than or equal to 0.1 and more desirably set to greater than or equal to 0.2.

Further, as has been described above for the second deformable part 70, in order to provide the second deformable part 71 having a certain length along the second surface 43a of the conductive brush 43, when a length from the root (see position F12 in FIG. 6A) of the conductive brush 43 on the terminal part 45 side to the position F21 (see FIG. 6A) of the conductive brush 43 in contact with the commutator 33 is 1, the second surface 61a preferably extends to the commutator 33 side such that a perpendicular can be drawn from a point on the second surface 61a of the second wall part 61 to a point on the conductive brush 43 at a length of greater than or equal to 0.4 on the commutator 33 side from the end part of the conductive brush 43 on the terminal part 45 side.

Note that, at this point too, the conductive brush 43 is not brought into contact with the commutator 33, and a perpendicular is drawn to the conductive brush 43 extending substantially straight.

Consequently, similarly to the second deformable part 70, since the second surface 61a corresponding to a range of greater than or equal to 0.4 is provided from the end part of the conductive brush 43 on the terminal part 45 side toward the commutator 33 side, the second deformable part 71 can be provided over the range of greater than or equal to 0.4.

(First Deformable Part 72)

As shown in FIG. 5, the bracket 40 includes a first wall part 62 provided at the bracket main body 40a. The first wall part 62 has a first surface 62a extending along a first surface 42b located at a side opposite the second surface 42a of the conductive brush 42 and toward the commutator 33 side (the center side of the bracket 40).

Note that the first surface 62a of the first wall part 62 is formed to be a surface parallel to the first surface 42b of the conductive brush 42.

As shown in FIG. 5, the motor 10 includes, between the first surface 42b of the conductive brush 42 and the first surface 62a of the first wall part 62, the first deformable part 72 formed of a gel or a grease and provided to be always in contact with (always adhere to) both of the surfaces.

Note that, as has been described for the second deformable part 70, "always in contact (always adhere)" herein does not mean that a contact (adhering) state is kept until the motor 10 becomes unusable. "Always in contact (always adhere)" means that the first deformable part 72 is always in contact with (always adhered to) both of the surfaces as long as an unusual situation does not occur during continuous use of the motor 10. Such an unusual situation may be occurrence of peeling between the first deformable part 72 and the first surface 42b or occurrence of peeling between the first deformable part 72 and the first surface 62a. It should not be understood to mean that the first deformable part 72 permanently continues to be in contact with (adhere to) both of the surfaces.

For example, the gel forming the first deformable part 72 may be a two-part hardening type, an ultraviolet curing type, a thermosetting type, or the like. From the viewpoint of suppressing vibration, the hardness of the gel is desirably greater than or equal to 30 and less than or equal to 70 in a type 00 hardness compliant with ASTM D 2240.

Further, from the viewpoint of suppressing vibration, the grease forming the first deformable part 72 desirably has consistency of greater than or equal to 60 and less than or equal to 165 in a grade 5 or a higher grade.

Note that, like the second deformable part 70, the first deformable part 72 may be configured as a part including a rubber member having a rubber hardness compliant with JIS K6253 (shore A hardness) of greater than or equal to 25 and less than or equal to 60.

By using a gel having a hardness as described above or a grease having consistency as described above, it is possible to obtain the first deformable part 72 having a softness that enables suppression of vibration satisfactorily, while suppressing fluidity of the first deformable part 72.

With the first deformable part 72 described above being provided between the first surface 42b of the conductive brush 42 and the first surface 62a of the first wall part 62 such that the first deformable part 72 is always in contact with both of the surfaces, occurrence of noise can be greatly reduced. To be more specific, when the conductive brush 42 tends to move in a direction away from the commutator 33, the first deformable part 72 softly deforms or is altered to absorb and stop the movement of the conductive brush 42. Accordingly, occurrence of noise can be greatly suppressed.

A state of the first deformable part 72 when the motor 10 is being driven will be described in detail with reference to FIGS. 7A and 7B.

Figure 7A:
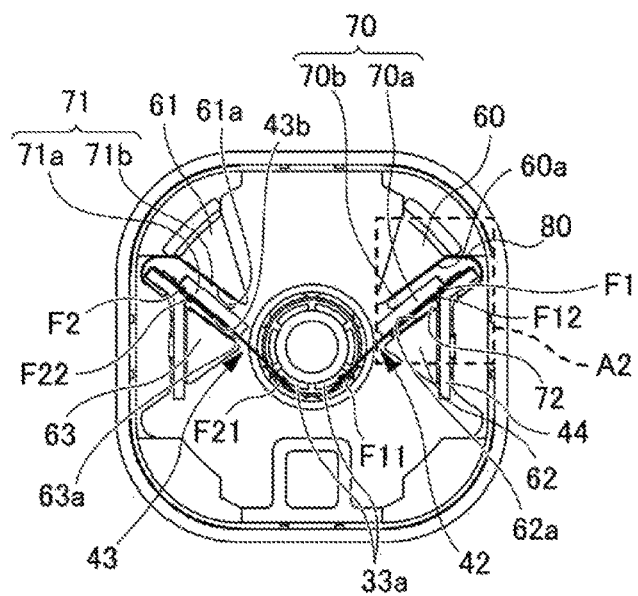
Figure 7B:
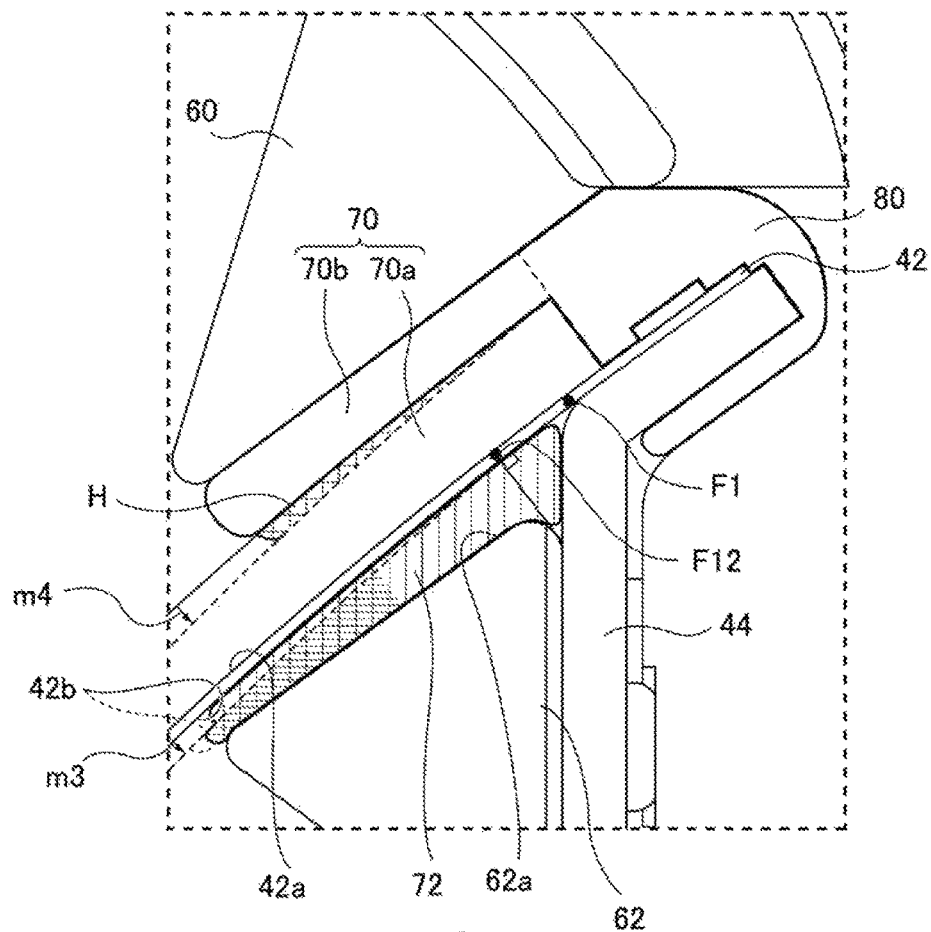

FIGS. 7A and 7B are diagrams for explaining a state of the first deformable part 72 while the motor 10 is being driven. FIG. 7A is a plan view of the bracket 40 viewed from the frame 20 side. FIG. 7B is an enlarged view of a dotted line region A2 of FIG. 7A.

Note that, in FIG. 7A, the sheet metals 33a of the commutator 33 provided in the armature 30 are also shown.

When the motor 10 is driven and the conductive brush 42 vibrates, for example, as shown in FIG. 7B, the first surface 42b of the conductive brush 42 is displaced from a position indicated by a solid line to a position indicated by a dotted line as indicated by an arrow m3.

At this point, the first deformable part 72 is deformed in response to the movement of the conductive brush 42.

Specifically, as shown in FIG. 7B, the shape of the first deformable part 72 changes from a state of hatching to a state of cross-hatching according to the movement of the conductive brush 42 indicated by the arrow m3.

Specifically, the shape of the first deformable part 72 is deformed in a direction in which the first surface 62a of the first wall part 62 extends or a direction in which the first surface 42b of the conductive brush 42 extends and toward the commutator 33.

That is, a part of the first deformable part 72 escapes (projects) to a space formed between the first surface 42b of the conductive brush 42 and the first surface 62a of the first wall part 62 where the first deformable part 72 does not exist.

The change in shape of the first deformable part 72 is a phenomenon caused by the first deformable part 72 being in contact with and sandwiched by both the first surface 42b of the conductive brush 42 and the first surface 62a of the first wall part 62.

That is, even if the first deformable part 72 is in contact with the first surface 42b of the conductive brush 42, if the first surface 62a side of the first wall part 62 is free, a compression force is not applied to the first deformable part 72. Therefore, the change in shape of the first deformable part 72 is extremely small.

As the first deformable part 72 is compressed and the shape of the first deformable part 72 changes, a reaction force acts on the conductive brush 42 to stop the movement of the conductive brush 42. Therefore, the movement of the conductive brush 42 is suppressed.

Note that the material forming the first deformable part 72 has not only elasticity but also viscosity. Therefore, as the first deformable part 72 is compressed and the shape of the first deformable part 72 is changed, an action absorbing a force that tends to move the conductive brush 42 simultaneously occurs.

On the other hand, when the conductive brush 42 moves oppositely, that is, when the first surface 42b of the conductive brush 42 tends to move in a direction opposite to the direction of the arrow m3 from the position of the dotted line to the position indicated by the solid line shown in FIG. 7B, the shape of the first deformable part 72 changes.

Specifically, the shape of the first deformable part 72 deforms in a direction in which the first surface 62a of the first wall part 62 extends or a direction in which the first surface 42b of the conductive brush 42 extends, and toward the end part F1 of the conductive brush 42.

That is, a part of the first deformable part 72 returns to a space formed between the first surface 42b of the conductive brush 42 and the first surface 62a of the first wall part 62 where the first deformable part 72 is present.

Since the first deformable part 72 is not an elastic body such as a spring, the first deformable part 72 does not immediately return to an original shape with an elastic force of the first deformable part 72. The change of the shape of the first deformable part 72 at the time when the conductive brush 42 is about to move to the position indicated by the solid line is mainly caused by a force generated by a bend of the conductive brush 42 (a restoring force).

As the first deformable part 72 is pulled by the movement of the conductive brush 42 in the opposite direction of the arrow m3 and the shape of the first deformable part 72 changes, reaction for stopping the movement of the conductive brush 42 in a direction away from the first surface 62a side of the first wall part 62 acts on the conductive brush 42.

According to the change of the shape, action for absorbing a moving force of the conductive brush 42 is simultaneously generated.

Note that the stopping action is also a phenomenon caused by the first deformable part 72 in contact with both the first surface 42b of the conductive brush 42 and the first surface 62a of the first wall part 62. If the first deformable part 72 is not in contact with the first surface 62a of the first wall part 62, the first deformable part 72 moves together with the conductive brush 42 in the same manner.

In this manner, the first deformable part 72 acts to suppress the movement of the conductive brush 42 when the conductive brush 42 tends to move from the position of the solid line to the position of the dotted line shown in FIG. 7B and also when the conductive brush 42 tends to move reversely from the position of the dotted line to the position of the solid line.

"The conductive brush 42 vibrates" means that the conductive brush 42 repeatedly moves between the position of the solid line and the position of the dotted line shown in FIG. 7B. However, as described above, the first deformable part 72 acts to suppress the movement and suppresses the vibration of the conductive brush 42 both when the conductive brush 42 moves toward the position of the solid line and toward the position of the dotted line.

Incidentally, as shown in FIG. 7B, when the first surface 42b of the conductive brush 42 moves from the position indicated by the solid line to the position indicated by the dotted line as indicated by the arrow m3, the second surface 42a of the conductive brush 42 moves in the same manner.

Then, the rubber member 71a of the second deformable part 70 also moves as indicated by an arrow m4. The shape of the buffer member 70b of the second deformable part 70 changes (see a cross-hatched part H).

Note that, in a case where the rubber member 71a also has a low rubber hardness, the shape of the rubber member 71a changes in a manner similar to the buffer member 70b.

As described above, when the shape of the second deformable part 70 changes, the reaction force by the second deformable part 70 acts on the conductive brush 42. The reaction force tends to stop the movement of the conductive brush 42 in a direction away from the second surface 60a side of the second wall part 60. The second deformable part 70 absorbs a moving force of the conductive brush 42.

Conversely, when the first surface 42b of the conductive brush 42 tends to move in a direction opposite to the arrow m3 from the position of the dotted line to the position indicated by the solid line shown in FIG. 7B, the shape of the second deformable part 70 changes.

As described above, when the shape of the second deformable part 70 changes, the reaction force by the second deformable part 70 acts on the conductive brush 42. The reaction force tends to stop the movement of the conductive brush 42. The second deformable part 70 absorbs a moving force of the conductive brush 42.

Therefore, in the present embodiment, both the first deformable part 72 and the second deformable part 70 cooperate to suppress the movement of the conductive brush 42.

Therefore, it is possible to perform higher suppression of vibration of the conductive brush 42 and greatly reduce noise.

On the other hand, in the first deformable part 72, as in the second deformable parts 70 and 71, in order to increase the shape change ratio VC, it is desirable to reduce the volume of the first deformable part 72 determined at a state before driving the motor 10.

As is seen from FIG. 7B, like the second deformable part 70, the first deformable part 72 is provided to be in contact with both the first surface 42b of the conductive brush 42 and the first surface 62a of the first wall part 62. Therefore, the volume of the first deformable part 72 is adjusted by the distance between the first surface 42b of the conductive brush 42 and the first surface 62a of the first wall part 62.

In the first deformable part 72, as in the second deformable part 70, the length and the like of the conductive brush employed varies depending on the size of the motor. Accordingly, the distance between the first surface 42b of the conductive brush 42 and the first surface 62a of the first wall part 62 to provide the first deformable part 72 with an appropriate volume is preferably determined based on the length of the conductive brush 42.

Here, the length from the root (see position F1 shown in FIG. 7B where the conductive brush 42 is not supported by the terminal part 44) of the conductive brush 42 on the terminal part 44 side to position F11 (see FIG. 7A) where the conductive brush 42 is in contact with the commutator 33 is 1. Then, a distance (hereinafter also referred to as second distance) between the first surface 42b of the conductive brush 42 and the first surface 62a of the first wall part 62 is desirably set to be less than or equal to 0.5 and more desirably set to less than or equal to 0.3.

The first wall part 62 is provided in the bracket main body 40a such that the second distance between the first surface 42b of the conductive brush 42 and the first surface 62a of the first wall part 62 is a predetermined distance.

Like the first distance, the second distance is obtained as follows. With the conductive brush 42 not in contact with the commutator 33 and the conductive brush 42 extending substantially straight, perpendiculars are drawn from points on the first surface 62a of the first wall part 62 to the conductive brush 42. Then, distances between the first surface 42b of the conductive brush 42 and the first surface 62a of the first wall part 62 are calculated. The second distance is the longest distance among the calculated distances.

On the other hand, if the second distance is short, the first deformable part 72 sometimes cannot be sufficiently deformed. Therefore, the second distance is desirably set to greater than or equal to 0.1 and more desirably set to greater than or equal to 0.2.

Further, similarly to the second deformable part 70, the first deformable part 72 preferably has a certain length along the first surface 42b of the conductive brush 42. Therefore, the first surface 62a of the first wall part 62 preferably has a certain length along the first surface 42b of the conductive brush 42.

Specifically, a length from the root (see position F1 in FIG. 7B) of the conductive brush 42 on the terminal part 44 side to position F11 (see FIG. 7A) of the conductive brush 42 in contact with the commutator 33 is assumed to be 1. A position F12 (see FIG. 7B) where a perpendicular is drawn from a point closest to the root (see position F1 in FIG. 7B) side of the conductive brush 42 on the first surface 62a of the first wall part 62 is taken as a reference. The first surface 62a preferably extends to the commutator 33 side to such an extent that a perpendicular can be drawn from a point on the first surface 62a of the first wall part 62 to a point on the conductive brush 42 at a length of greater than or equal to 0.4 on the commutator 33 side from position F12.

Note that, here too, the conductive brush 42 is not brought into contact with the commutator 33 and a perpendicular is drawn to the conductive brush 42 extending substantially straight.

In this manner, the first surface 62a corresponding to a range of greater than or equal to 0.4 is provided from position F12 close to the root of the conductive brush 42 on the terminal part 44 side toward the commutator 33 side. Therefore, it is possible to provide the first deformable part 72 over a range of greater than or equal to 0.4.

(First Deformable Part 73)

As shown in FIG. 5, the bracket 40 includes a first wall part 63 provided at the bracket main body 40a. The first wall part 63 has a first surface 63a extending along a first surface 43b located at a side opposite the second surface 43a of the conductive brush 43 and toward the commutator 33 side (the center side of the bracket 40).

Note that the first surface 63a of the first wall part 63 is formed to be a surface substantially parallel to the first surface 43b of the conductive brush 43.

The motor 10 includes, between the first surface 43b of the conductive brush 43 and the first surface 63a of the first wall part 63, the first deformable part 73 formed of a gel or a grease and provided to be always in contact with (always adhere to) both of the surfaces.

Note that, as has been described for the second deformable part 70, "always in contact (always adhere)" herein does not mean that a contact (adhering) state is kept until the motor 10 becomes unusable. "Always in contact (always adhered)" means that the first deformable part 73 is always in contact with (always adhered to) both of the surfaces as long as an unusual situation does not occur during continuous use of the motor 10. Such an unusual situation may be occurrence of peeling between the first deformable part 73 and the first surface 43b or occurrence of peeling between the first deformable part 73 and the first surface 63a "Always in contact (always adhered)" should not be understood to mean that the first deformable part 73 permanently continues to be in contact with (adhere to) both of the surfaces.

For example, the gel forming the first deformable part 73 may be a two-part hardening type, an ultraviolet curing type, a thermosetting type, or the like. From the viewpoint of suppressing vibration, the hardness of the gel is desirably greater than or equal to 30 and less than or equal to 70 in a type 00 hardness compliant with ASTM D 2240.

From the viewpoint of suppressing vibration, the grease forming the first deformable part 73 desirably has consistency of greater than or equal to 60 and less than or equal to 165 in a grade 5 or a higher grade.

Note that, like the second deformable part 71, the first deformable part 73 may be configured to include a rubber member having a rubber hardness compliant with JIS K6253 (shore A hardness) of greater than or equal to 25 and less than or equal to 60.

Note that, by using the gel having the hardness as described above or the grease having the consistency as described above, the first deformable part 73 having a softness enabling satisfactory suppression of vibration while suppressing fluidity of the first deformable part 73 can be obtained.

With the first deformable part 73 as described above being provided between the first surface 43b of the conductive brush 43 and the first surface 63a of the first wall part 63 such that the first deformable part 73 is always in contact with both of the surfaces, the first deformable part 73 is softly deformed or altered to absorb a force that tends to move the conductive brush 43 in a direction away from the commutator 33. It is possible to greatly reduce occurrence of noise.

The first deformable part 73 is a part acting on the conductive brush 43 in the same manner as the first deformable part 72 acting on the conductive brush 42. Therefore, while the motor 10 is driven, the first deformable part 73 is in the same state as the state described for the first deformable part 72.

Therefore, although detailed explanation is omitted, also for the first deformable part 73, the length from the root (see position F2 shown in FIG. 7A where the conductive brush 43 is not supported by the terminal part 45) of the conductive brush 43 on the terminal part 45 side to position F21 (see FIG. 7A) where the conductive brush 43 is in contact with the commutator 33 is 1. Then, at least in the range where the first deformable part 73 is provided, a distance (hereinafter also referred to as second distance) between the first surface 43b of the conductive brush 43 and the first surface 63a of the first wall part 63 is preferably set to be less than or equal to 0.5 and more desirably set to less than or equal to 0.3.

The first wall part 63 is provided in the bracket main body 40a such that the second distance between the first surface 43b of the conductive brush 43 and the first surface 63a of the first wall part 63 is a predetermined distance.

The second distance is obtained as follows. With the conductive brush 43 not in contact with the commutator 33 and the conductive brush 43 extending substantially straight, perpendiculars are drawn from points on the first surface 63a of the first wall part 63 to the conductive brush 43. Then, distances between the first surface 43b of the conductive brush 43 and the first surface 63a of the first wall part 63 are calculated. Like the second distance described for the first deformable part 72, the second distance is the longest distance among the calculated distances.

Similarly to the first distance of the second deformable part 70 described above, when the second distance corresponding to the first deformable part 73 is short, the first deformable part 73 sometimes cannot be sufficiently deformed. Therefore, the second distance corresponding to the first deformable part 73 is also desirably greater than or equal to 0.1, and more desirably greater than or equal to 0.2.

Further, in order to provide the first deformable part 73 having a certain length along the first surface 43b of the conductive brush 43, as has been described above for the first deformable part 72, when a length from the root (see position F12 in FIG. 7B) of the conductive brush 43 on the terminal part 45 side to position F21 (see FIG. 7A) of the conductive brush 43 in contact with the commutator 33 is 1, taking a position F22 (see FIG. 7A) where a perpendicular is drawn from a point closest to the root (see position F1 in FIG. 7B) side of the conductive brush 42 on the second surface 60a of the second wall part 60 as a reference, the first surface 63a desirably extends to the commutator 33 side to such an extent that a perpendicular can be drawn from a point on the first surface 63a of the first wall part 63 to a point on the conductive brush 43 at a length of greater than or equal to 0.4 on the commutator 33 side from position F22.

Note that, at this point as well, the conductive brush 43 is not brought into contact with the commutator 33 and the perpendicular is drawn to the conductive brush 43 extending substantially straight.

Consequently, the first surface 63a corresponding to a range of greater than or equal to 0.4 is provided from position F22 close to the root of the conductive brush 43 on the terminal part 45 side toward the commutator 33 side. Therefore, it is possible to provide the first deformable part 73 over a range of greater than or equal to 0.4 or more.

Note that a relationship between the first deformable part 73 and the second deformable part 71 with respect to the conductive brush 43 is the same as the relationship between the first deformable part 72 and the second deformable part 70 with respect to the conductive brush 42.

Therefore, as described for the first deformable part 72, both the first deformable part 73 and the second deformable part 71 cooperate to suppress movement of the conductive brush 43.

Therefore, vibration of the conductive brush 43 can be greatly suppressed, and noise can be greatly reduced.

On the other hand, as shown in FIG. 5, the bracket 40 includes an accommodating part 80 provided at the bracket main body 40a and configured to accommodate at least a part of the first end portion 44b (the one end portion 44ba on the one end side of the first end portion 44b) of the terminal part 44 (see FIG. 4).

A buffer member 80a formed of a gel or a grease in contact with both the accommodating part 80 and the one end portion 44ba on the one end side of the first end portion 44b of the terminal part 44 is also provided in a gap between the accommodating part 80 and the one end portion 44ba on the one end side of the first end portion 44b of the terminal part 44 (see FIG. 4). Vibration of the conductive brush 42 is reduced or vibration is less easily transmitted to the bracket 40. A further reduction in noise can be achieved.

Similarly, as shown in FIG. 5, the bracket 40 includes an accommodating part 81 provided at the bracket main body 40a and configured to accommodate at least a part of the first end portion 45b (the one end portion 45ba on the one end side of the first end portion 45b) of the terminal part 45 (see FIG. 4).

A buffer member 81a of a gel or a grease in contact with both the accommodating part 81 and the one end portion 45ba on the one end side of the first end portion 45b of the terminal part 45 is also provided in a gap between the accommodating part 81 and the one end portion 45ba on the one end side of the first end portion 45b of the terminal part 45 (see FIG. 4). Vibration from the conductive brush 43 is less easily transmitted to the bracket 40. A further reduction in noise can be achieved.

Incidentally, as described above, the motor 10 including the configuration described above can greatly reduce noise. Further, with the first deformable part 72 and the second deformable part 70, it is possible to suppress an occurrence of a phenomenon in which the conductive brush 42 instantly separates from the commutator 33 due to an influence of vibration or the like.

Accordingly, a spark is suppressed from occurring between the commutator 33 and the conductive brush 42. It is possible to greatly reduce wear of the conductive brush 42.

Similarly, with the first deformable part 73 and the second deformable part 71, it is possible to suppress an occurrence of a phenomenon in which the conductive brush 43 instantly separates from the commutator 33 due to an influence of vibration or the like. A spark is suppressed from occurring between the commutator 33 and the conductive brush 43. It is possible to greatly reduce wear of the conductive brush 43.

Therefore, the life of the conductive brush 42 and the conductive brush 43 is extended. The life of the motor 10 can also be greatly extended.

Note that, although not limitative, the first deformable part 72 and the second deformable part 70 are preferably provided in a range of greater than or equal to ⅓ of the length of the conductive brush 42.

Similarly, the first deformable part 73 and the second deformable part 71 are desirably provided in a range of greater than or equal to ⅓ of the length of the conductive brush 43.

Second Embodiment

A second embodiment of the motor 10 of the present disclosure is described with reference to FIG. 8.

In the second embodiment, a basic configuration is the same as the basic configuration in the first embodiment. The second embodiment is different from the first embodiment only in the configuration of the bracket 40.

Therefore, the bracket 40 in the second embodiment is mainly described below. Explanation is sometimes omitted concerning similarities to the first embodiment.

Figure 8:
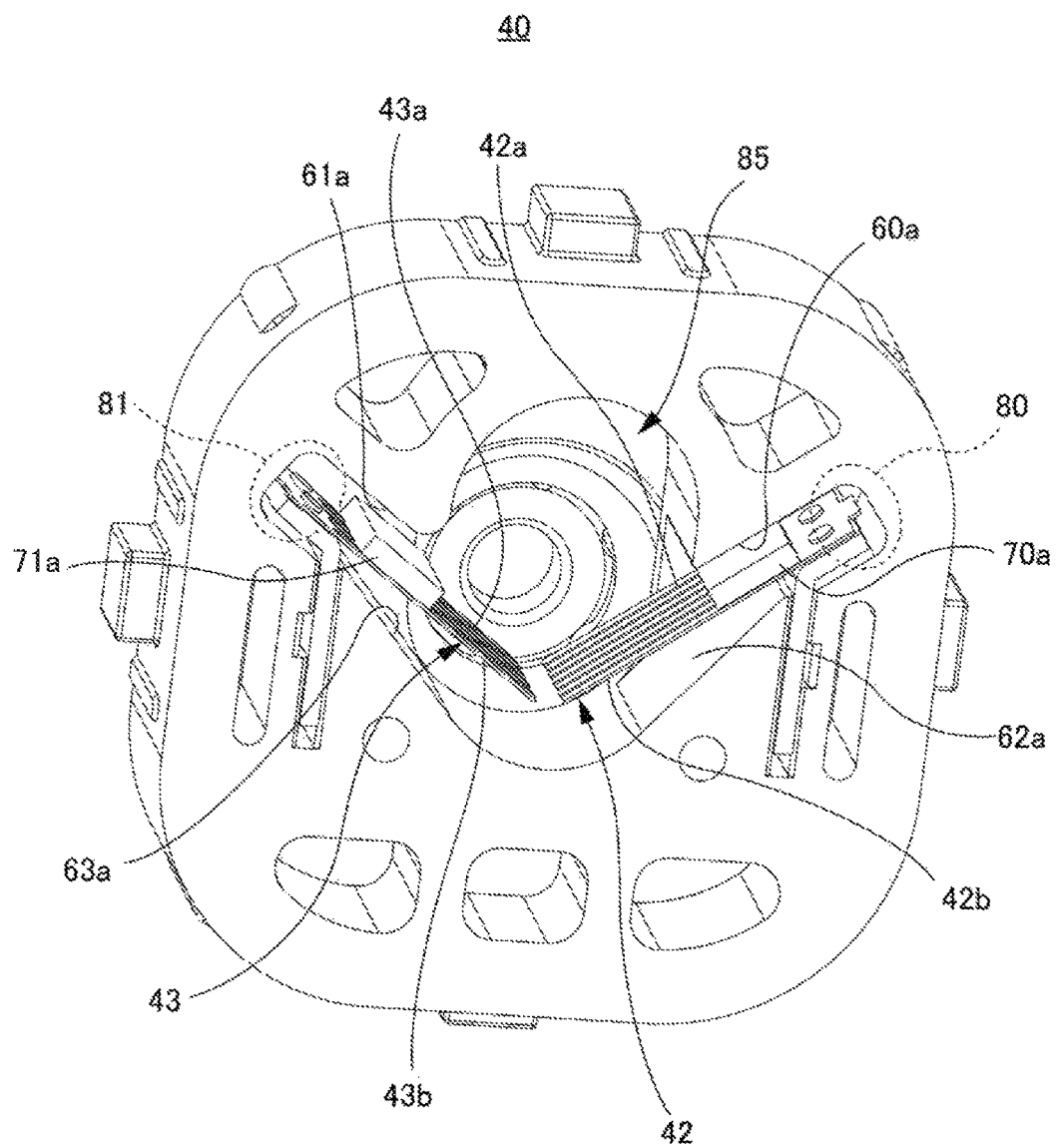
FIG. 8 is a perspective view of a bracket according to a second embodiment of the present disclosure.

In the bracket 40 in the second embodiment, as shown in FIG. 8, the bracket main body 40a and the bearing plate 40b in the first embodiment are integrally formed.

In the first embodiment, as shown in FIGS. 4 and 5, the first wall parts 62 and 63 and the second wall parts 60 and 61 are separately formed.

On the other hand, in the second embodiment, as shown in FIG. 8, one concave part 85 is formed in the bracket 40 having large thickness. The first surfaces 62a and 63a, the second surfaces 60a and 61a, the accommodating parts 80 and 81, and the like are integrally configured by the inner surface (hereinafter referred to as inner wall surface) of the concave part 85.

In this case, parts of the concave part 85 configuring the first surfaces 62a and 63a and the second surfaces 60a and 61a are the first wall parts 62 and 63 and the second wall parts 60 and 61 in the first embodiment.

Note that, in the second embodiment, the first surface 62a configured by a part of the inner wall surface of the concave part 85 of the bracket 40 is formed as an inclined surface. The distance to the inclined surface from the first surface 42b of the conductive brush 42 increases toward the commutator 33 side (the center side of the bracket 40), with respect to the first surface 42b of the conductive brush 42.

For the first surface 62a formed as the inclined surface in this manner, i.e., the distance to the inclined surface from the first surface 42b of the conductive brush 42 increases, it is also possible to draw perpendiculars from the first surface 62a to the first surface 42b of the conductive brush 42. The distance between the first surface 42b of the conductive brush 42 and the first surface 62a is desirably determined as the second distance described in the first embodiment.

Preferably, the first surface 62a extends to the commutator 33 side in a manner similar to the manner described for the first embodiment.

Similarly, the first surface 63a configured by a part of the inner wall surface of the concave part 85 of the bracket 40 is formed as an inclined surface. The distance to the inclined surface from the first surface 43b of the conductive brush 43 increases toward the commutator 33 side (the center side of the bracket 40), with respect to the first surface 43b of the conductive brush 43.

In the first surface 63a, as in the first surface 62a, the distance between the first surface 43b of the conductive brush 43 and the first surface 63a is desirably set to the second distance described in the first embodiment.

Also, preferably, the first surface 63a extends to the commutator 33 side in a manner similar to the manner described for the first embodiment.

Although not shown in FIG. 8, a gel, a grease, or the like is injected between the first surface 62a formed with the inner wall surface of the concave part 85 and the first surface 42b of the conductive brush 42, and the first deformable part is provided so as to be always in contact with (always adhering to) the first surface 62a formed with the inner wall surface of the concave part 85 and the first surface 42b of the conductive brush 42.

A gel, a grease, or the like is injected between the first surface 63a formed with the inner wall surface of the concave part 85 and the first surface 43b of the conductive brush 43 to provide the first deformable part so as to be always in contact with (always adhered to) the first surface 63a formed with the inner wall surface of the concave part 85 and the first surface 43b of the conductive brush 43.

Further, by injecting a gel, a grease, or the like, the second deformable part always in contact with (always adhered to) the second surface 60a configured by the inner wall surface of the concave part 85 and the second surface 42a of the conductive brush 42 is provided between the second surface 60a configured by the inner wall surface of the concave part 85 and the second surface 42a of the conductive brush 42.

In addition, by injecting a gel, a grease, or the like, the second deformable part always in contact with (always adhered to) the second surface 61a configured by the inner wall surface of the concave part 85 and the second surface 43a of the conductive brush 43 is provided between the second surface 61a configured by the inner wall surface of the concave part 85 and the second surface 43a of the conductive brush 43.

Further, in addition, a gel, a grease, or the like is injected into the accommodating parts 80 and 81 as well.

Note that the aforementioned injection of the gel or the grease need not be performed separately. The gel or the grease need only be injected simultaneously into portions forming the first deformable part, the accommodating part 80, and the second deformable part provided for the conductive brush 42.

Similarly, the gel or the grease need only be injected simultaneously into portions forming the first deformable part, the accommodating part 81, and the second deformable part provided for the conductive brush 43.

The bracket 40 of the second embodiment configured as described above can achieve an advantage similar to the advantage achieved by the first embodiment.

Note that, also in the second embodiment, as shown in FIG. 8, the rubber member 70a is provided at the second surface 42a of the conductive brush 42.

However, the rubber member 70a may be omitted, may be provided on the first surface 42b side of the conductive brush 42, or may be provided on both of the first surface 42b and the second surface 42a of the conductive brush 42.

Similarly, the rubber member 71a is provided at the second surface 43a of the conductive brush 43. However, the rubber member 71a may be omitted, may be provided on the first surface 43b side of the conductive brush 43, or may be provided on both of the first surface 43b and the second surface 43a of the conductive brush 43.

Note that "always in contact (always adhered)" in the second embodiment should be understood as the same meaning as the meaning described in the first embodiment.

That is, "always in contact (always adhered)" means that the second deformable part 71 is always in contact with (always adhered to) the second surfaces as long as an unusual situation such as occurrence of peeling does not occur during usage of the motor 10. In other words, it should not be understood that "always in contact (always adhered)" means that the second deformable part 71 permanently continues to be in contact with (adhere to) the second surfaces.

(Rotary Apparatus)

Hereinafter, as an example of an application of the motor 10 having the configuration described above, a rotary apparatus 50 configured to control turning of a louver 104 (see FIG. 12) used in an air conditioning system 100 (see FIG. 12) of an automobile or the like will be described.

Figure 9:
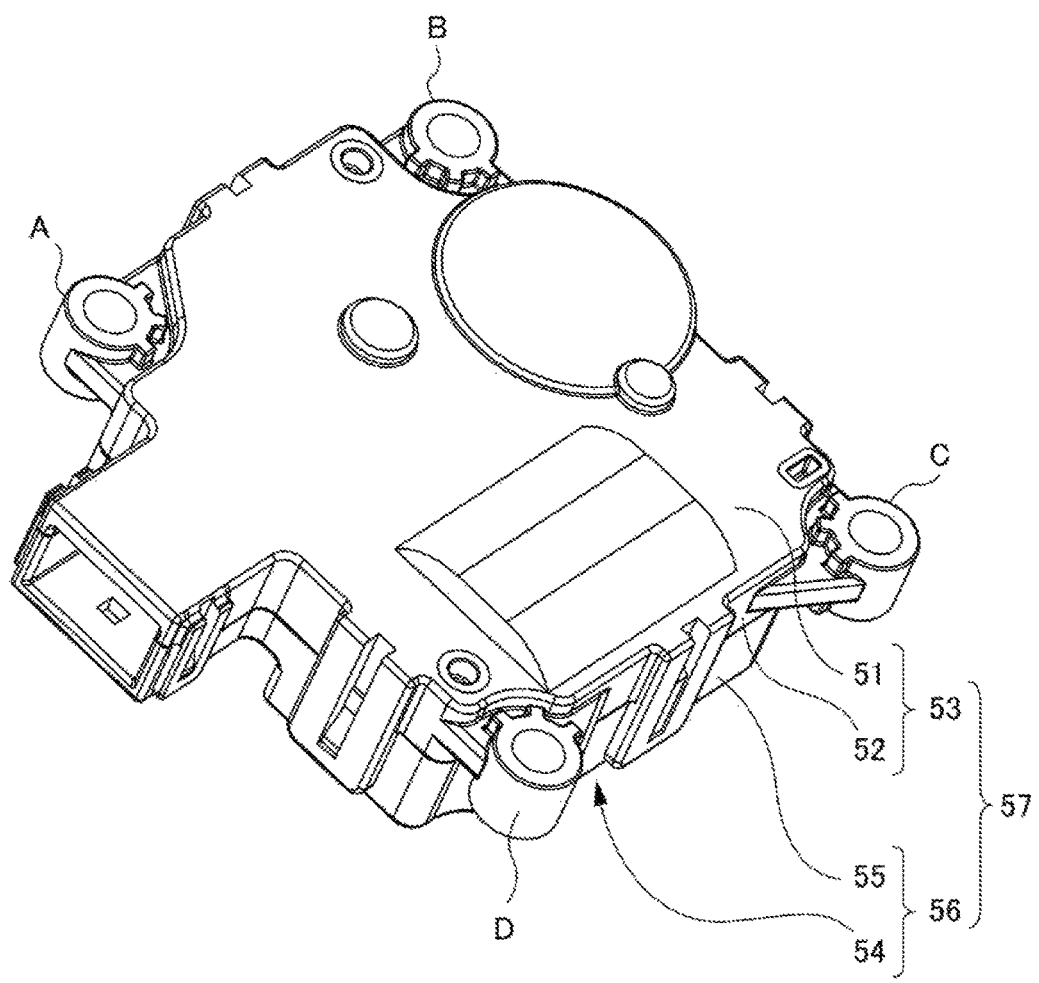
FIG. 9 is a perspective view showing a rotary apparatus according to an embodiment of the present disclosure.
Figure 10:
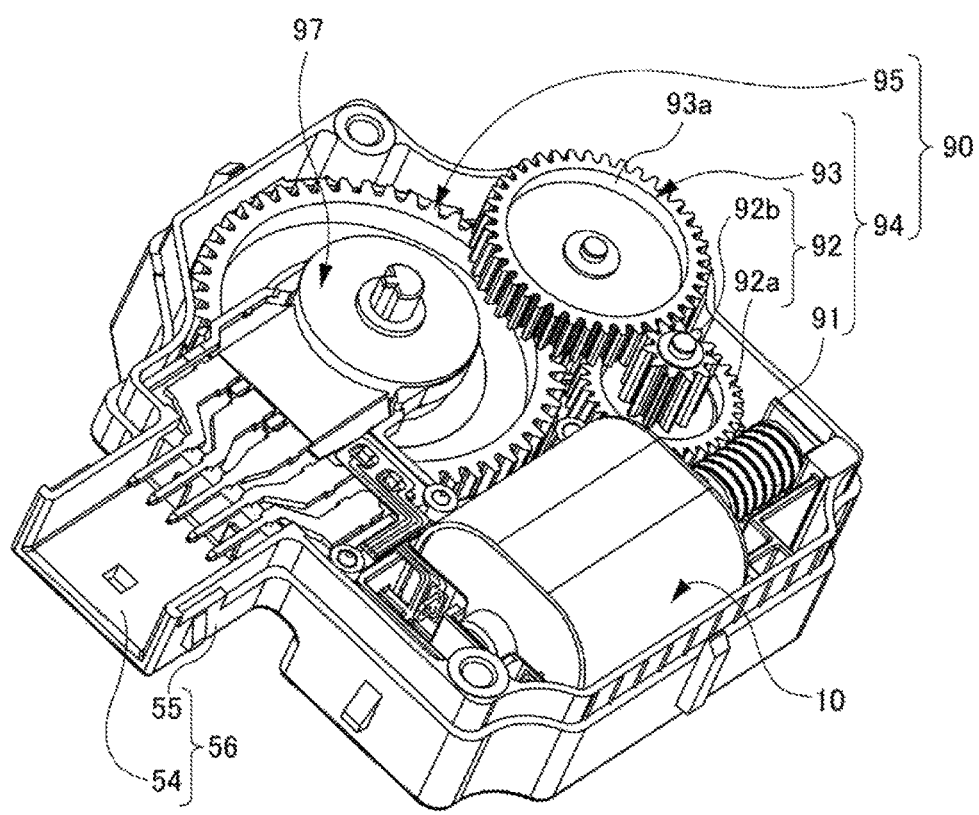
FIG. 10 is a perspective view of the rotary apparatus according to the embodiment with a first housing being removed.
Figure 11:
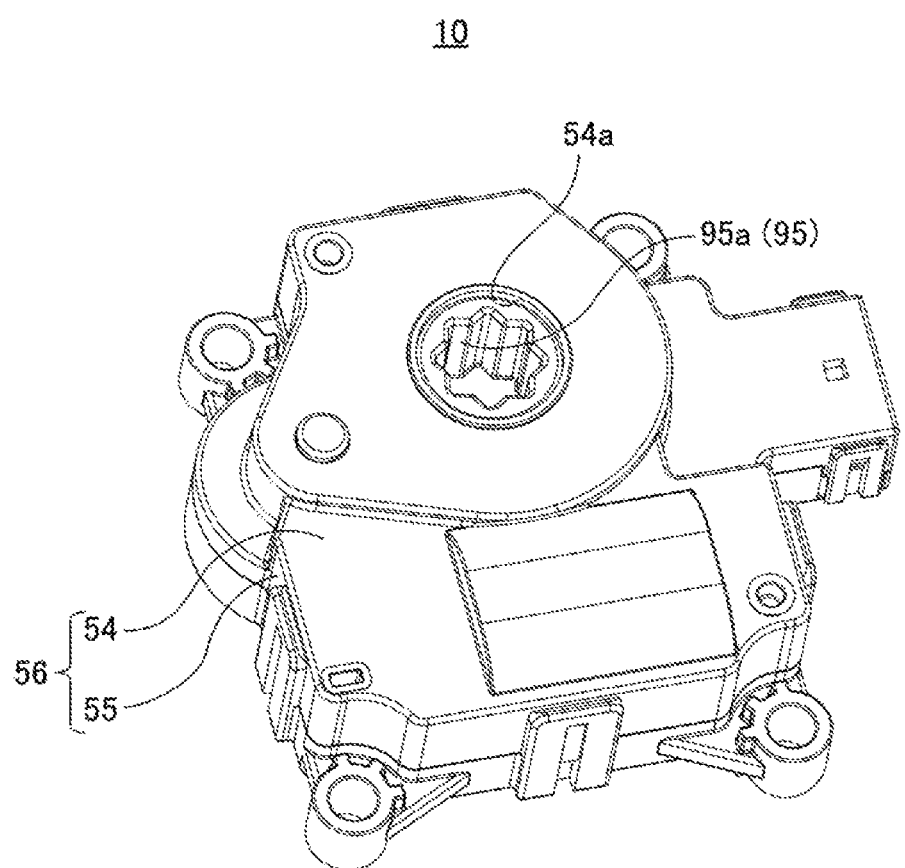
FIG. 11 is a perspective view of the rotary apparatus according to the embodiment of the present embodiment viewed from a second surface part side of a second housing.

FIG. 9 is a perspective view showing the rotary apparatus 50 including the motor 10. FIG. 10 is a perspective view of the rotary apparatus 50 with the first housing 53 being removed. FIG. 11 is a perspective view of a second housing 56 of the rotary apparatus 50 viewed from a second surface part 54 side.

As shown in FIG. 9, the rotary apparatus 50 includes a housing 57 formed by coupling a first housing 53 and a second housing 56. The first housing 53 includes a first surface portion 51 as a surface portion and a first side wall portion 52 provided at an outer peripheral portion of the first surface portion 51. The second housing 56 also further includes a second surface portion 54 as a surface portion and a second side wall portion 55 provided at an outer peripheral portion of the second surface portion 54.

Note that the housing 57 is formed with a resin material such as polypropylene, polybutylene terephthalate, or ABS.

Attaching parts A, B, C, and D for attaching the rotary apparatus 50 to the air conditioning system 100 (see FIG. 12) are formed integrally with the first side wall part 52 at the outer periphery of the first housing 53.

On the other hand, as shown in FIG. 10, the rotary apparatus 50 includes, as various components housed in the housing 57 (see FIG. 9), the motor 10 including the configuration described in the first embodiment and the second embodiment, a plurality of gears 90 including an output gear 95 configured to mechanically output rotation of the rotary shaft 31 (see FIG. 1) of the motor 10 to the outside, and a sensor 97 configured to detect a rotation angle of the output gear 95.

The second surface part 54 of the second housing 56 is provided with an opening part 54a (see FIG. 11) at a portion corresponding to the center side of the output gear 95. As shown in FIG. 11, an engaging part 95a of the output gear 95 is accessible from outside through the opening part 54a provided in the second surface part 54 of the second housing 56.

For example, a drive shaft (see rotary shaft 104a in FIG. 12) of the louver 104 (see FIG. 12) of the air conditioning system 100 provided in a vehicle such as an automobile, not shown, is engaged with the engaging part 95a of the output gear 95. Pivoting of the louver 104 is controlled by controlling the rotation of the motor 10.

Figure 12:
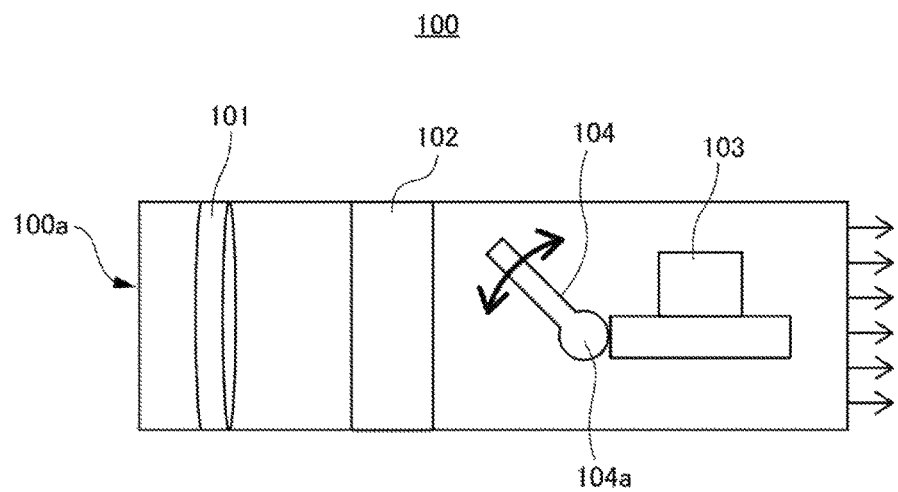
FIG. 12 is a schematic diagram for explaining an air conditioning system including the rotary apparatus according to the embodiment of the present disclosure.

The rotation of the motor 10 is controlled based on a relationship between rotation of the output gear 95 and driving of the louver 104 (see FIG. 12).

Therefore, as shown in FIG. 10, a signal corresponding to the rotation of the output gear 95 is output by the sensor 97 disposed on the output gear 95. The rotation of the motor 10 is controlled based on the output signal.

Note that, in this embodiment, as shown in FIG. 10, the rotation of the rotary shaft 31 (see FIG. 1) of the motor 10 is transmitted to the output gear 95 via a plurality of transmission gears 94 (a worm gear 91, a first two-step gear 92, and a second two-step gear 93).

Specifically, the transmission gears 94 include the worm gear 91 fixed to the rotary shaft 31 (see FIG. 1) of the motor 10, the first two-step gear 92 and the second two-step gear 93. The first two-step gear 92 includes a large-diameter gear 92a meshing with the worm gear 91 and a small-diameter gear 92b. The second two-step gear 93 includes a large-diameter gear 93a meshing with the small-diameter gear 92b of the first two-step gear 92 and a small-diameter gear meshing with the output gear 95.

In this manner, the rotation of the rotary shaft 31 (see FIG. 1) of the motor 10 is transmitted to the output gear 95 at a predetermined gear ratio making use of a small space.

However, it is not always necessary to transmit the rotation to the output gear 95 with the three transmission gears. If necessary, the first two-step gear 92 and the second two-step gear 93 may be omitted.

(Vehicle Including the Air Conditioning System)

The above described rotary apparatus 50 is used, for example, in an air conditioning system 100 for a vehicle such as an automobile. Hereinafter, the following brief description will focus on an example for use in a vehicle air conditioning system 100.

Figure 13:
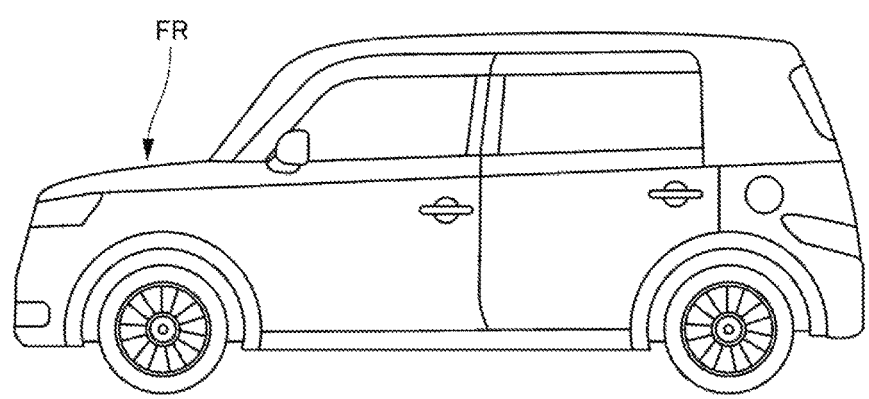
FIG. 13 is a diagram showing a vehicle including the air conditioning system shown in FIG. 10.

FIG. 12 is a schematic view for describing an air conditioning system 100 including the rotary apparatus 50 according to the present embodiment. FIG. 13 is a diagram illustrating a vehicle including the air conditioning system 100 in FIG. 12.

As illustrated in FIG. 12, the air conditioning system 100 includes a blower fan 101, an evaporator 102, a heater 103, and a louver 104, which are disposed in a front part FR (see FIG. 13) of the vehicle.

More specifically, the blower fan 101 is disposed on a side of a suction port 100a of the air conditioning system 100. The evaporator 102 for cooling the air sent out from the blower fan 101 is disposed on the downstream side in the air flow direction.

Further, the heater 103 is disposed closer to the downstream side in the air flow direction than the evaporator 102, and the louver 104 is interposed between the evaporator 102 and the heater 103. The louver 104 controls the amount of air flowing from the evaporator 102 to the heater 103 so as to adjust the air to an appropriate temperature.

Then, the air adjusted to an appropriate temperature passes through a duct or the like and is supplied into the vehicle from an air outlet provided in the vehicle. In the above described air conditioning system 100, for example, a rotary shaft 104a of the louver 104 is connected to an engaging part 95a (see FIG. 11) of the output gear 95 of the above described rotary apparatus 50.

As described above, the rotary apparatus 50 controls the rotation of the louver 104 to a predetermined state (See double arrow in FIG. 12).

Note that the above described configuration is just an example of the rotary apparatus 50 in the air conditioning system 100. For example, the air conditioning system 100 may switch the air flow path (duct route) between a path for circulating air within the vehicle and a path for introducing air into the vehicle from the outside, in which case the louver is provided in the switching part.

Therefore, the rotary apparatus 50 may also be used for controlling the louver provided in the switching part in a suitable manner.

The present disclosure is explained above based on the embodiments. However, the present disclosure is not limited to the embodiments. It goes without saying that various changes in a range not departing from the spirit of the present disclosure are possible.

Therefore, embodiments obtained by performing the various changes in the range not departing from the spirit of the present disclosure are also included in the technical scope of the present disclosure. For those skilled in the art, this is evident from the description of claims.

What is claimed is:
1. A motor comprising:
   a commutator;
   one conductive brush including a second surface contacting with the commutator and a first surface located at a side opposite the second surface, and
   a terminal part including a first end portion having one end portion and other end portion, a part of the first surface of the conductive brush is connected to a surface of the one end portion, and
   a bracket including an accommodating part and a groove, and
   a first wall part and a second wall part arranged at the bracket in a commutator side with respect to the accommodating part, and
   a first deformable part including a buffer member, and
   a second deformable part including a buffer member and a member made of a rubber material, the buffer material contacting with the member made of the rubber material, wherein the accommodating part accommodates the one end portion of the first end portion and the part of the first surface of the conductive brush, and the other end portion of the first end portion is arranged at the groove, and the one end portion of the first end portion is bent relative to the other end portion of the first end portion, and the first wall part is arranged in the first surface side of the conductive brush, and the second wall part is arranged in the second surface side of the conductive brush, and the first deformable part contacts with the first surface of the conductive brush and the first wall part, and the second deformable part contacts with the second surface of the conductive brush and the second wall part, and the buffer member of the second deformable part is arranged in the accommodating part, and the buffer member of the first deformable part is arranged in the commutator side with respect to the other end portion of the first end portion.

2. The motor according to claim 1, wherein the buffer member of the second deformable part contacts with an inner surface of the bracket forming the accommodating part and the conductive brush and the one end portion of the first end portion.

3. The motor according to claim 1, wherein the buffer member of the second deformable part contacts with an end part of the conductive brush in the terminal part side and an inner surface of bracket in the second surface side of the conductive brush.

4. The motor according to claim 1, wherein the buffer member of the second deformable part surrounds an end part of the conductive brush in the terminal part side.

5. The motor according to claim 1, wherein the buffer member of the second deformable part contacts with an end part of the conductive brush and an inner surface of bracket in the first surface side of the conductive brush.

6. The motor according to claim 1, wherein the first deformable part includes one of a gel and a grease.

7. The motor according to claim 1, wherein the second deformable part includes one of a gel and a grease.

8. The motor according to claim 1, comprising:
an armature including a commutator, and
a frame; and
a magnet provided at the frame, wherein
the frame includes a bottom part and a side wall part,
the bottom part includes a hole part passing a rotary shaft of the armature through to an outside, and
the side wall part covers an outer periphery of the armature and includes an opening part on a side opposite to the bottom part,
the magnet is provided at an inner wall surface of the side wall part of the frame, the inner wall surface faces the armature, and
the bracket is attached to the opening part of the frame.

9. The motor according to claim 1, wherein the member made of the rubber material is fixed to the second surface of the conductive brush.

10. The motor according to claim 1, wherein the buffer member contacts with the member made of the rubber material and the second wall part.

11. The motor according to claim 1, wherein the member made of the rubber material includes a flat shape.

12. The motor according to claim 1, wherein the buffer member of the first deformable part and the buffer member of the second deformable part are separated by the member made of the rubber material.

13. A rotary apparatus comprising:
the motor according to claim 1;
a plurality of gears including an output gear configured to output rotation of the motor to the outside; and
a housing configured to house the plurality of gears and the motor.

14. A vehicle comprising:
an air conditioning system including the rotary apparatus according to claim 13; and
a louver controlled by the rotary apparatus.

* * * * *